United States Patent
Heap et al.

(10) Patent No.: US 7,090,613 B2
(45) Date of Patent: Aug. 15, 2006

(54) METHOD OF PROVIDING ELECTRIC MOTOR TORQUE RESERVE IN A HYBRID ELECTRIC VEHICLE

(75) Inventors: Anthony H. Heap, Ann Arbor, MI (US); Tung-Ming Hsieh, Carmel, IN (US); Gregory A. Hubbard, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 208 days.

(21) Appl. No.: 10/846,153

(22) Filed: May 15, 2004

(65) Prior Publication Data

US 2005/0255964 A1 Nov. 17, 2005

(51) Int. Cl.
- *B60K 1/02* (2006.01)
- *B60K 1/00* (2006.01)
- *G06F 17/00* (2006.01)

(52) U.S. Cl. ............................ 477/3; 180/65.2; 701/55
(58) Field of Classification Search .................... 477/3; 180/65.2, 65.8; 903/942, 945; 701/55, 56, 701/59

See application file for complete search history.

(56) References Cited

U.S. PATENT DOCUMENTS

| | | | |
|---|---|---|---|
| 5,873,426 A * | 2/1999 | Tabata et al. ................... 477/2 |
| 6,524,216 B1 * | 2/2003 | Suzuki et al. ................... 477/3 |
| 6,763,622 B1 * | 7/2004 | Schulz et al. ................ 903/942 |
| 7,024,299 B1 * | 4/2006 | Hubbard et al. ................ 477/3 |
| 2003/0001391 A1 * | 1/2003 | Kuang et al. ............. 290/40 C |
| 2003/0085577 A1 * | 5/2003 | Takaoka et al. .......... 290/40 C |
| 2004/0195017 A1 * | 10/2004 | Braun et al. ................ 180/65.2 |
| 2005/0060079 A1 * | 3/2005 | Phillips et al. ................ 701/53 |
| 2005/0071067 A1 * | 3/2005 | Guven et al. ................. 701/54 |
| 2005/0080540 A1 * | 4/2005 | Steinmetz et al. ............ 701/55 |

\* cited by examiner

*Primary Examiner*—Roger Pang
(74) *Attorney, Agent, or Firm*—Christopher DeVries

(57) ABSTRACT

A method of operating a vehicle powertrain system comprising an electric motor and transmission where the electric motor is operably and selectively coupled to the transmission and adapted to provide an output torque contribution thereto, and the electric motor has a predetermined maximum motor output torque and a predetermined minimum motor output torque which are used to determine a range of permissible control points for at least one transmission control parameter. The method includes establishing a motor torque reserve by performing at least one of decreasing the predetermined maximum motor output torque to a maximum reserved motor output torque and increasing the minimum motor output torque to a minimum reserved motor output torque, wherein the maximum reserved motor output torque and the minimum reserved motor output torque are used in place of the predetermined maximum motor output torque and the predetermined minimum motor output torque, respectively, to determine the range of permissible control points for the at least one transmission control parameter.

38 Claims, 16 Drawing Sheets

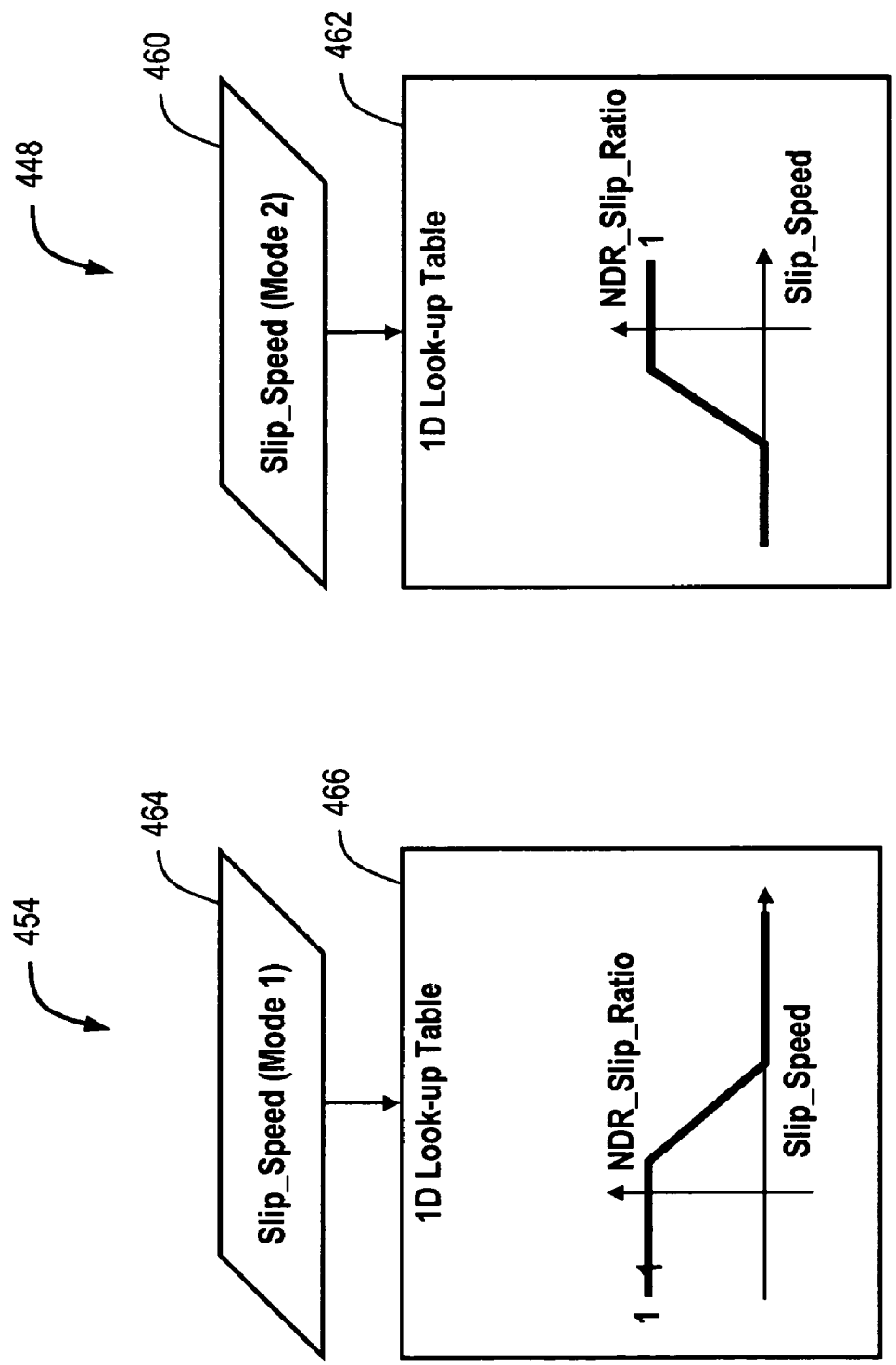

METHOD OF PROVIDING ELECTRIC MOTOR TORQUE RESERVE IN A HYBRID ELECTRIC VEHICLE

TECHNICAL FIELD

The present invention is related to control of a vehicular powertrain system. More particularly, the invention is related to the control of the electric motors of a vehicle powertrain system which includes an electrically variable transmission (EVT). Most particularly, the present invention is a method of establishing an electric motor torque reserve for the electric motors of an EVT in order to improve the overall responsiveness of the EVT to actual or expected changes in transmission control parameters.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

It is known in the art of vehicular powertrain controls to interpret an operator's request for torque into a system torque command to affect an output torque to the vehicle driveline. Such interpretation and command require relatively simple control management dominated by the available engine torque in relation to a vehicle's present set of operating parameters, which relationship is relatively well understood. In electrically variable transmission based hybrid powertrains a number of factors in addition to the available engine torque affect the output torque that can be provided to the vehicle driveline. It is known in such hybrid powertrains to interpret an operator's request for torque into a system torque command and allow individual sub-system limitations to dictate actual output torque. Such limitations include, for example, available engine torque, available electric machine torque and the available electrical energy storage system power. It is preferable to understand the various subsystem individual and interactive constraints affecting available powertrain output torque such that output torque commands are issued consistent with such torque availability and subsystem constraints.

In the case of the electric machine torque, the limitations that affect the output torque that can be provided to the vehicle driveline include the maximum and minimum torque output limits of the electric machine or machines. During vehicle operation and the real-time control of the vehicle powertrain and EVT, these maximum and minimum torque limits are typically used in conjunction with the determination of the available operation or control points of the EVT, including the control of a number of transmission control parameters, such as the input speed, output speed, input torque and output torque. There are various operating conditions wherein the electric motor or motors may be operating at or near the maximum or minimum, such that the desired motor output torque (and the contribution to the transmission output torque) may be constrained, thereby affecting the desired control of the vehicle. For example, for synchronous shifts, the potential exists for a sudden change in output torque command at first synchronization because of a system output torque constraint change, such as a targeted input acceleration change; which may result in unacceptable input speed control if the system happens to be operating at or near one or more of the maximum or minimum motor torque limits. Such limits can thus affect the shift synchronization and overall shifting performance. In another example, if the measured input speed begins to vary from the desired input speed, either higher or lower, and the electric machine or machines happen to be being operated at or near their maximum or minimum limits, the ability to use them to address the input speed control problem may be restricted or prohibited altogether. This limitation may necessitate sudden and undesirable changes in transmission output torque or other transmission control parameters to affect the necessary input speed control.

Therefore, it is desirable to establish a real time reserve of motor torque to avoid vehicle operation at control points that do not permit a smooth or robust response of the vehicle powertrain using the electric machine or machines.

SUMMARY OF THE INVENTION

A method of operating a vehicle powertrain system comprising an electric motor and transmission, the electric motor operably and selectively coupled to the transmission and adapted to provide an output torque contribution thereto, the electric motor having a predetermined maximum motor output torque and a predetermined minimum motor output torque which are used to determine a range of permissible control points for at least one transmission control parameter. The method comprises establishing a motor torque reserve by performing at least one of decreasing the predetermined maximum motor output torque to a maximum reserved motor output torque and increasing the minimum motor output torque to a minimum reserved motor output torque, wherein the maximum reserved motor output torque and the minimum reserved motor output torque are used in place of the predetermined maximum motor output torque and the predetermined minimum motor output torque, respectively, to determine the range of permissible control points for the at least one transmission control parameter.

The method is preferably implemented as a computer control algorithm adapted for storage and execution in a controller, such as the system controller. The algorithm essentially provides an electric motor torque reserve to improve the control robustness of the overall system.

The algorithm allows for a smooth output torque profile to be present through a synchronous shift of the transmission by predicting when the shift will occur, and ensuring that enough electric motor torque reserve is present by that time to perform the shift fluidly (i.e., not requiring an abrupt change in output torque during the shift). The method is advantageous in that it adds control robustness and improved shift quality to the synchronous shift.

The algorithm also allows for the addition of more electric motor torque reserve reactively under cases where an input speed error exceeds a predetermined error limit. It observes the input speed error as it develops and makes the appropriate system level trade-offs (including the potential of dropping the magnitude of the peak allowable output torque) to give the electric motors the torque reserve necessary to attack the input speed error directly. This advantageously provides input speed control robustness.

BRIEF DESCRIPTION OF THE DRAWINGS

The present invention will be more fully understood from the accompanying drawings, in which:

FIG. 13 is block diagram illustrating a routine for determining the NDR_Slip Ratio in Mode 2;

FIG. 14 is block diagram illustrating a routine for determining the NDR_Slip Ratio in Mode 1;

DESCRIPTION OF THE PREFERRED EMBODIMENT

Figure 1:
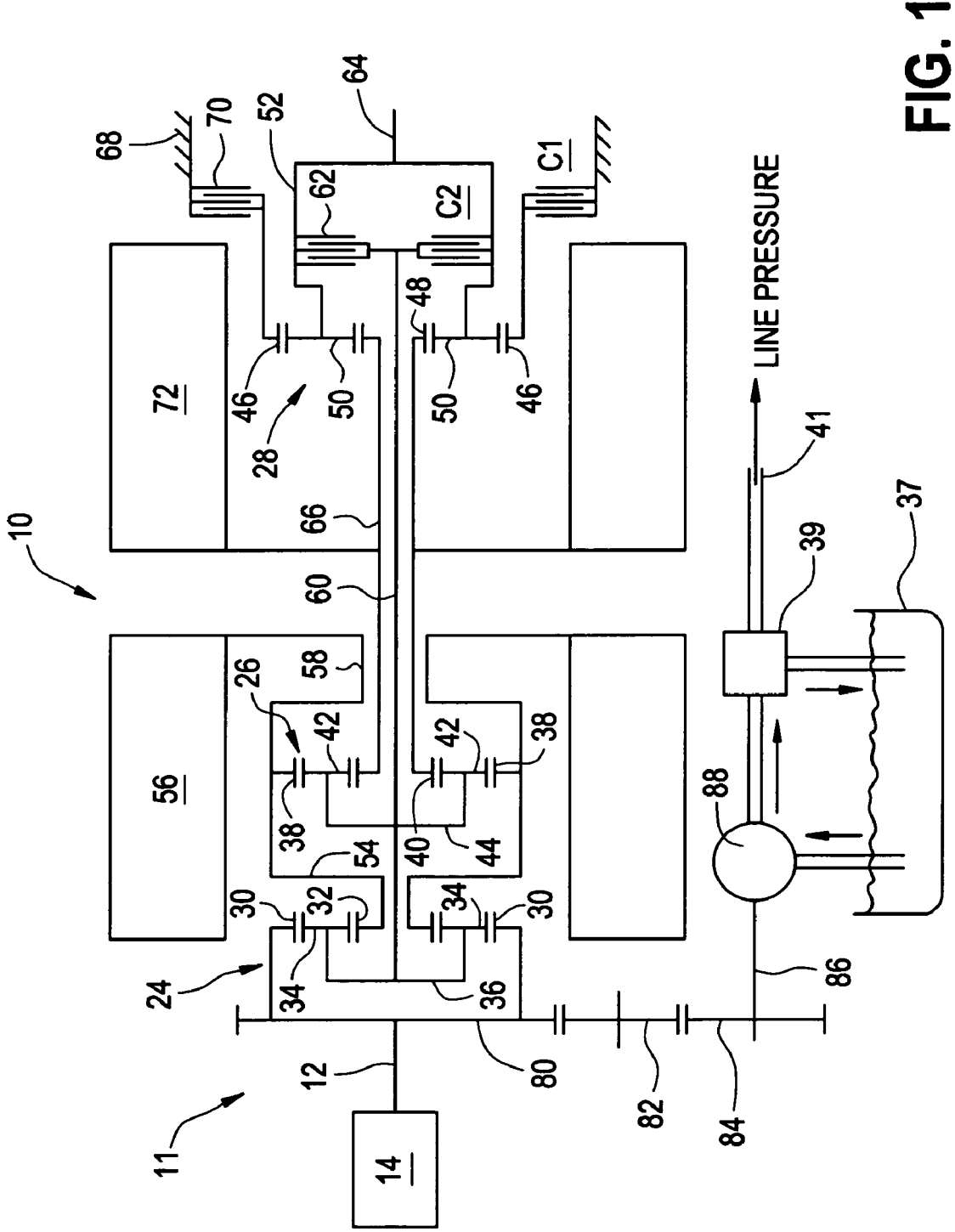
FIG. 1 is a mechanical hardware schematic representation of one preferred form of a two-mode, compound-split, electrically variable transmission particularly suited to the implementation of the present invention.
Figure 2:
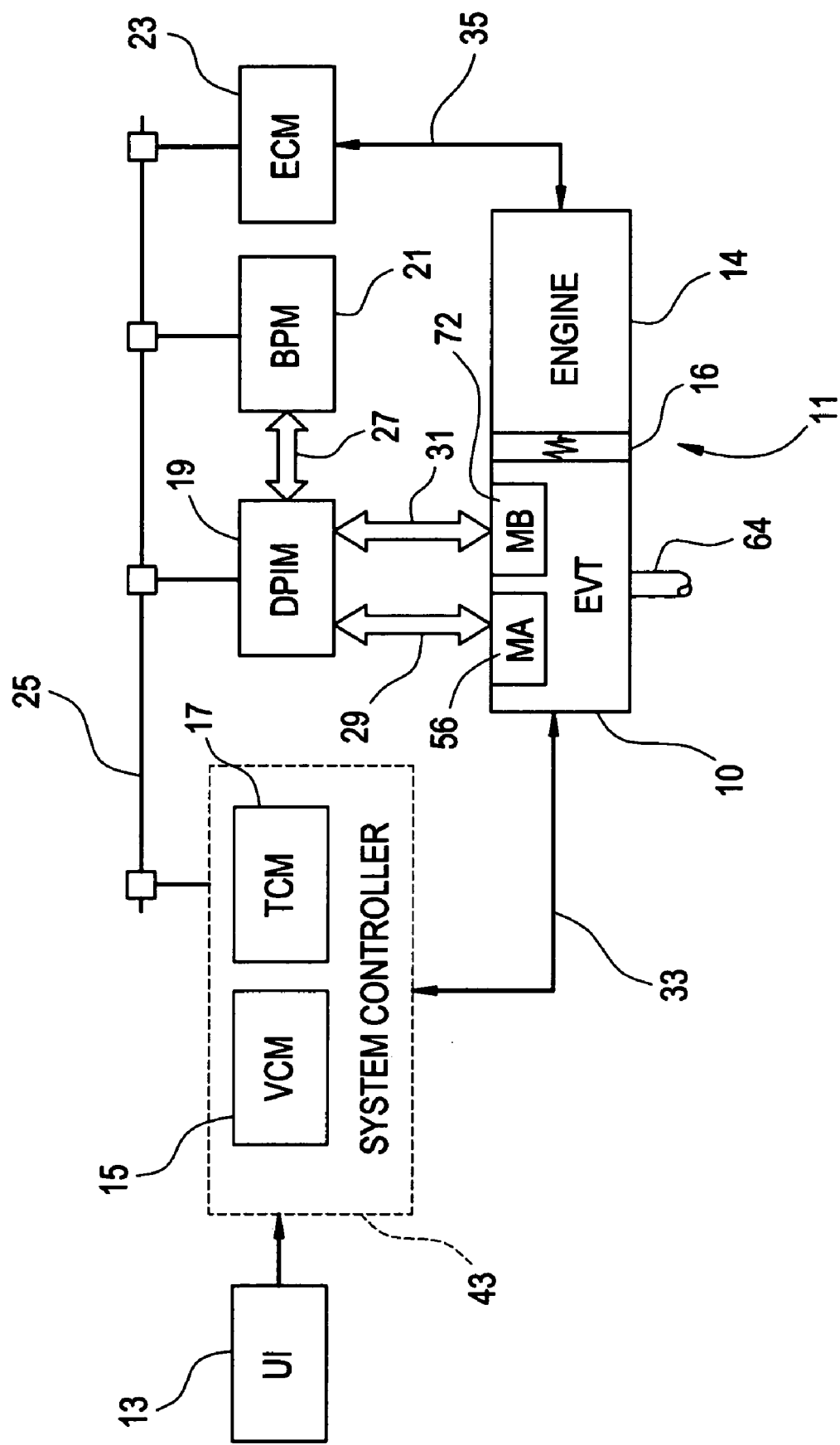
FIG. 2 is an electrical and mechanical schematic of a preferred system architecture for the hybrid powertrain disclosed herein.

With reference first to FIGS. 1 and 2, a vehicular powertrain system is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used. Those skilled in the art will recognize MODE 1 as an input split arrangement and MODE 2 as a compound split arrangement.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engine electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. The powertrain system also includes such energy storage devices which are an integral part of the power flows thereof. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others.

System controller 43 determines a torque command Te_cmd and provides it to ECM 23. Torque command Te_cmd is representative of the EVT torque contribution desired from the engine as determined by the system controller. System controller 43 also determines a speed command Ne_des representative of the EVT input speed desired, which in the direct coupled arrangement between the engine and the EVT is also the desired engine speed operating point. With the direct coupled arrangement exemplified herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein. Desired input torque operating points are preferably determined as disclosed in commonly assigned and co-pending U.S. patent application Ser. No. 10/799,531 which is incorporated herein by reference. Desired input speed operating points are preferably determined as disclosed in commonly assigned and co-pending U.S. patent application Ser. No. 10/686,508 and Ser. No. 10/686,034 which are incorporated herein by reference. A preferred speed control for a hybrid transmission is described in detail in commonly assigned and co-pending U.S. patent application Ser. No. 10/686,511 which is incorporated herein by reference.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
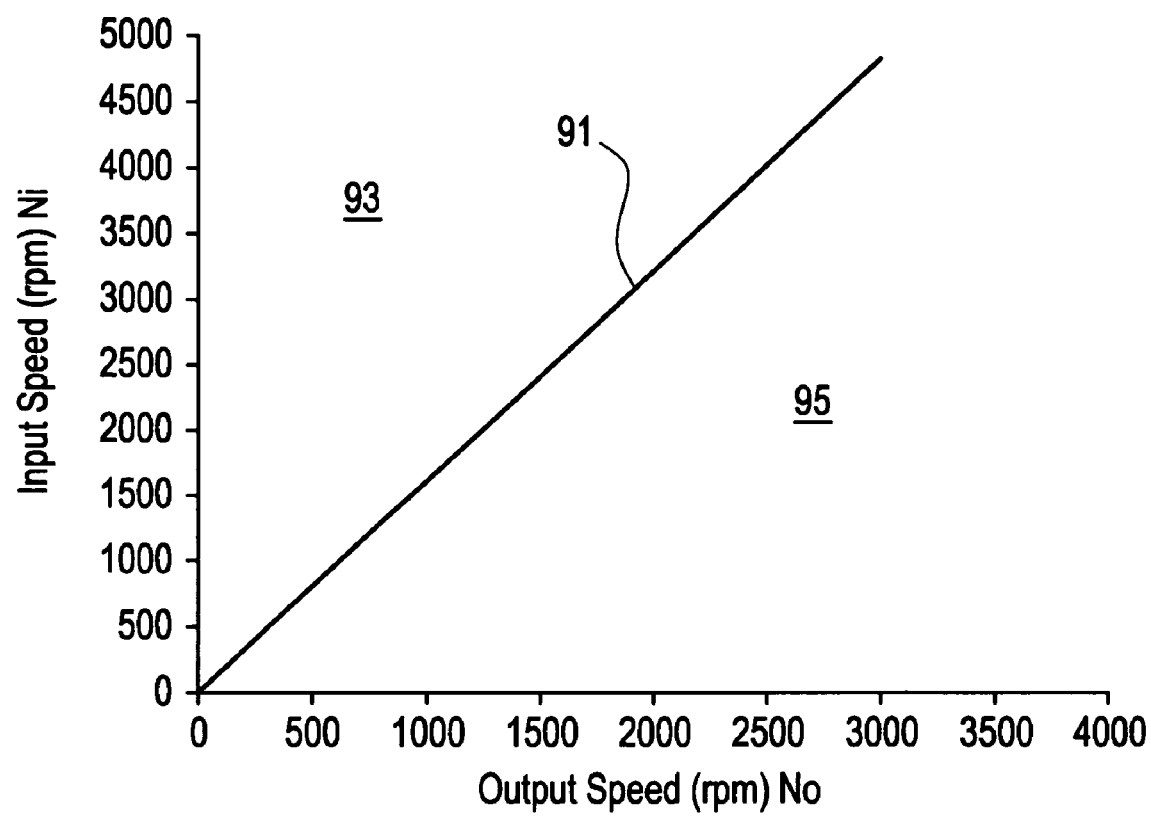
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be affected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 95. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4:
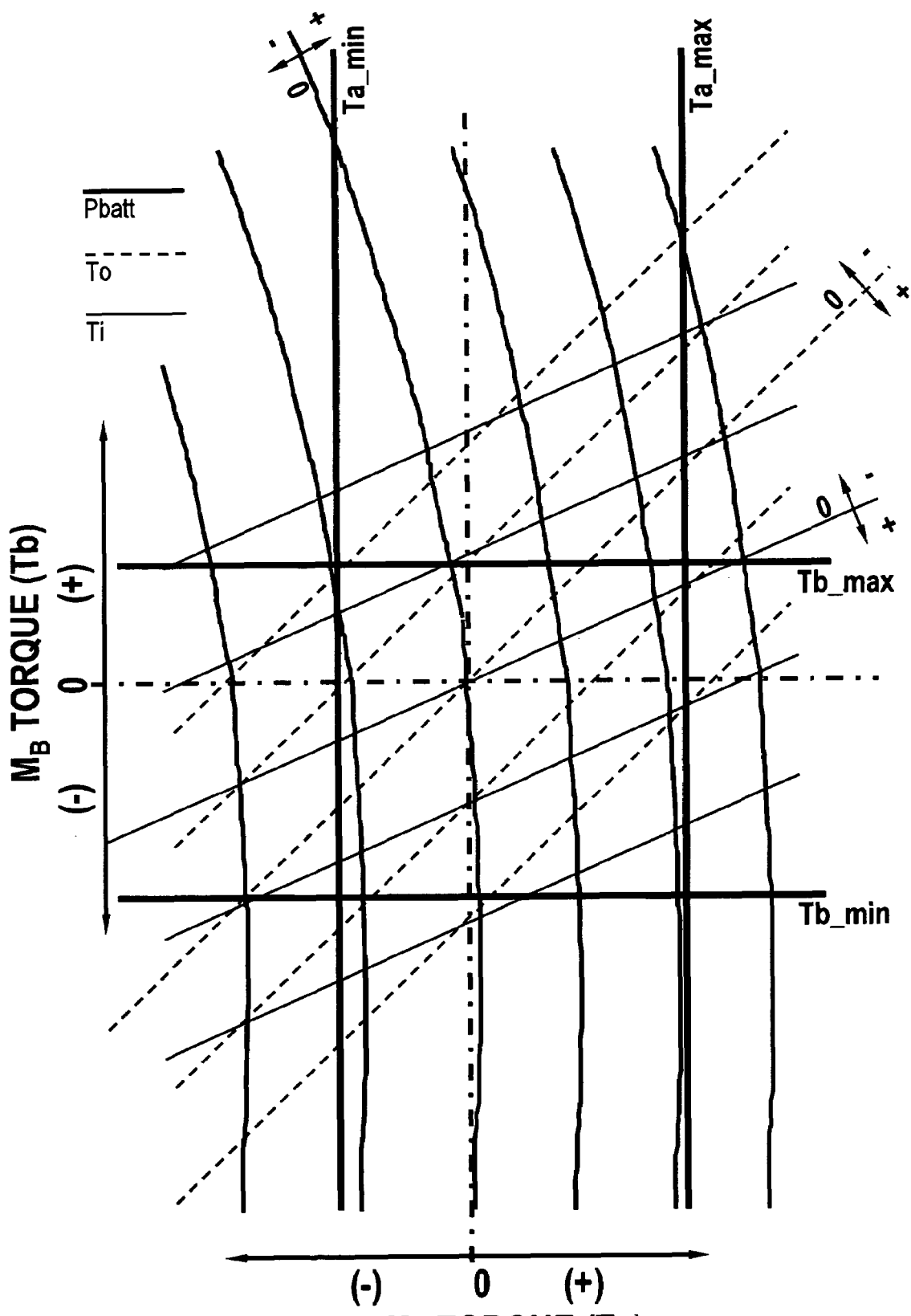
FIG. 4 is a torque space plot in motor torques (Ta and Tb) including lines of constant battery power (Pbat), lines of constant output torque (To) and lines of constant input torque Ti.

With reference now to FIG. 4, an exemplary partial motor torque space (Ta-Tb space) for MODE 2 operation shows motor A ($M_A$) torque plotted across the horizontal axis and motor B ($M_B$) torque plotted across the vertical axis at given values of Na and Nb. Boundaries are drawn corresponding to certain exemplary maximum and minimum motor A torques (Ta_min, Ta_max), the maximum and minimum being with respect to motor capabilities at certain exemplary present operating conditions in Na (i.e., Ni, No and Mode), the precise values of which are not required for the present exposition of the teachings to be gained from FIG. 4 and the present discussion. Similar boundaries are drawn corresponding to such exemplary maximum and minimum motor B torques (Tb_min, Tb_max), the maximum and minimum being with respect to motor capabilities at certain exemplary present operating conditions in Nb (i.e., Ni, No and Mode). The space bounded by maximum and minimum motor torques represents a feasible solution space at present conditions for the motor units $M_A$ and $M_B$. This is a general representation of a feasible motor torque solution space for a two motor EVT powertrain system, such as powertrain system 11, however, it is believed that the general concepts described herein for a two motor system may be extended by one of ordinary skill to powertrain systems comprising more than two electric machines which are operably and selectively coupled, such as in the manner described herein, to the transmission, to define a corresponding multi-dimensional solution space of feasible motor torques.

Within this motor torque space are plotted several other parameter lines of constant values for a given value of Ni_dot and No_dot. A plurality of lines of constant battery power, Pbat, are plotted which represent constant battery power solutions within the motor torque space. Also plotted within this motor torque space are lines of constant output torque, To, which represent constant output torque solutions within the space. Finally, lines of constant input torque are plotted within the motor torque space and represent constant input torque solutions therein. Increasing and decreasing trend directions for these respective lines of constancy are shown by respective double-sided arrows associated with respective null lines of constancy. In the graphic representation of FIG. 4, while the sub-space with respect to determined Ta and Tb minimums and maximums (Ta_min, Ta_max, Tb_min, Tb_max) is feasible in accordance with the torque capabilities of the respective motor units, the lines of constant battery power (Pbat), lines of constant output torque (To) and lines of constant input torque (Ti) are not necessarily representative of feasible solutions with respect to their respective subsystem capabilities at present conditions but do represent theoretically unconstrained modeling of the system within the motor torque space.

As indicated, FIG. 4 represents a torque space qualified for MODE 2 operation. A similar torque space is understood for MODE 1 also. However, in MODE 1, it is significant to note that the lines of constant input torque appear vertically since in the input split configuration of MODE 1, the input torque is decoupled from the motor B torque. This specific case underscores the general rule that the motor torque space as described and set forth herein is adaptable to all EVT configurations and modes established by the numerous possible coupling combinations between motors, engines and outputs of an electrically variable transmission, including modes which completely decouple inputs and outputs from one or more motor torques. Separate discussion will not be made of MODE 1 in exemplifying the present invention. It is understood that the more general case of MODE 2 operation wherein the input is torque coupled to both motors A and B is sufficient for one skilled in the art to understand its application to more specific cases, including complete torque decoupling of one or more motors from the EVT input. Further information about Mode 1 operation in the context of the present invention, as well as additional information related to the operation of an EVT may be found in related, commonly assigned, co-pending U.S. patent application Ser. Nos. 11/112,058 and 11/112,216 which are both filed on even date herewith, and which are both hereby incorporated by reference herein in their entirety.

The values of Ta_max, Ta_min, Tb_max and Tb_min are predetermined in that they are generally fixed values which are characteristic of motors A and B, respectively, which are determined both theoretically and empirically (e.g., and are frequently supplied by the manufacturer of the motor), and which vary as a function of temperature, operating voltage, use, motor condition and other well-known factors which may be stored in a look-up table or similar data structure in a controller, such as system controller 43. As described above, there are various operating conditions wherein either or both of the motors may be operating at or near its maximum or minimum, such that desired changes in the system operating conditions (e.g., desired output torque of the transmission) which require a motor output torque contribution from either or both of the motor may be constrained due to the motor output torque limits. In other words, if the motors are permitted to operate at or adjacent to their operating limits, changes in system operating conditions requiring motor output torque contributions may not be possible, thereby necessitating abrupt changes in the system operating conditions in order to accommodate the constraint (e.g., an abrupt change in output torque of the transmission, or a degradation of the input speed control of the engine). Further, by establishing a reserve of motor torque, the system may also prepare for scheduled or anticipated or predicted system changes where quantifiable amounts of electric motor torque will be required (e.g., a synchronous shift), so as to both provide the needed electric motor torque contribution, but also do so within the maximum and minimum motor torque limits. Therefore, it is desirable to establish a real-time reserve of electric motor torque within the motor torque space defined by Ta_max, Ta_min, Tb_max and Tb_min. A general description of the concept of an electric motor torque reserve and the general types or categories of motor torque reserve and a method of establishing a motor torque reserve is provided herein and in reference to FIGS. 5 and 6. An embodiment of a predictive electric motor torque reserve in conjunction with an anticipated synchronous transmission shift and a preferred method for determining the predictive reserve is provided herein and with reference to FIGS. 7–16. An embodiment of a reactive torque reserve in conjunction with an actual input speed error is provided herein and with reference to FIG. 17.

Figure 5:
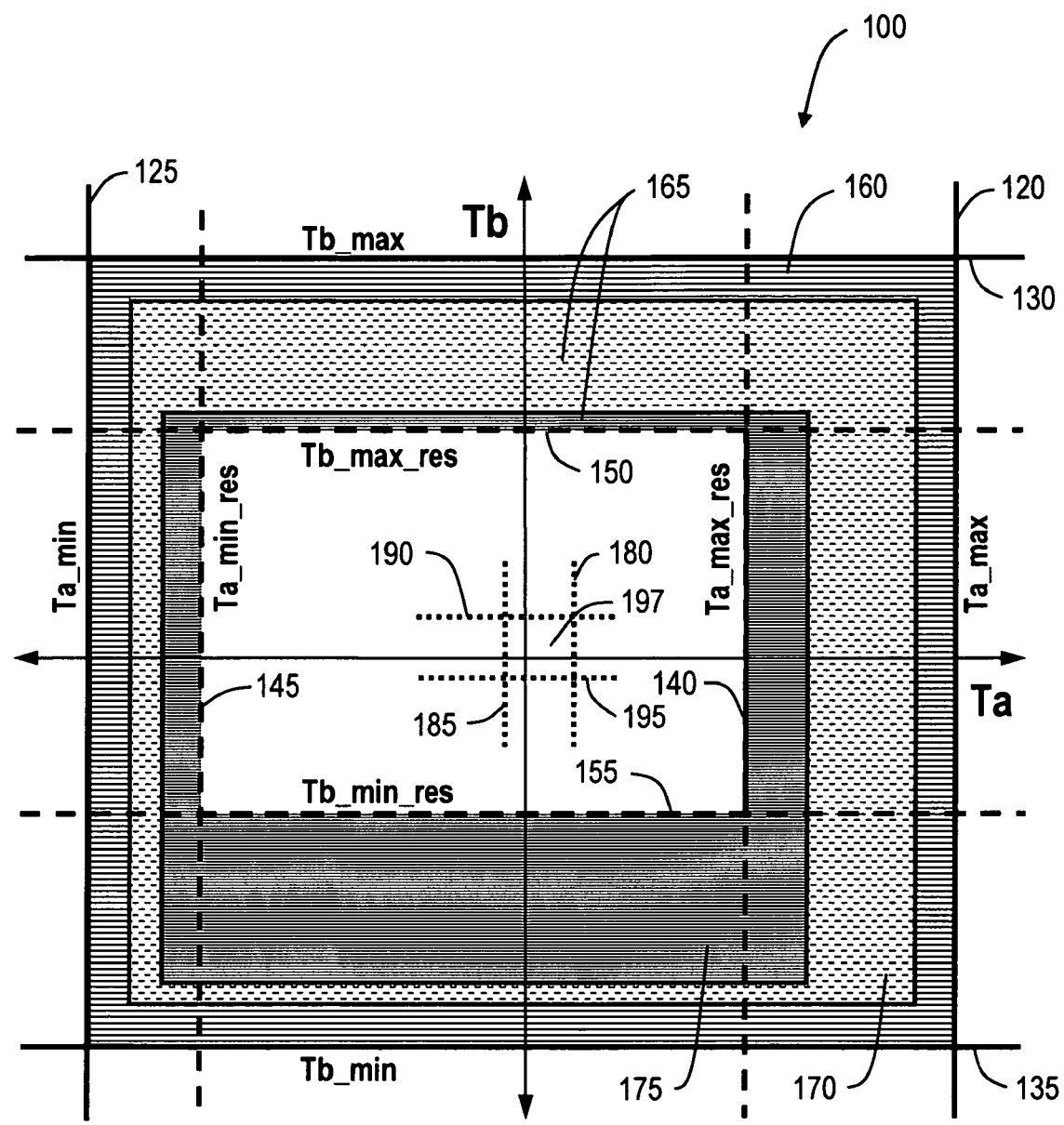
FIG. 5 is a schematic illustration of motor torque reserve in a HEV powertrain system comprising two electric drive motors.
Figure 6:
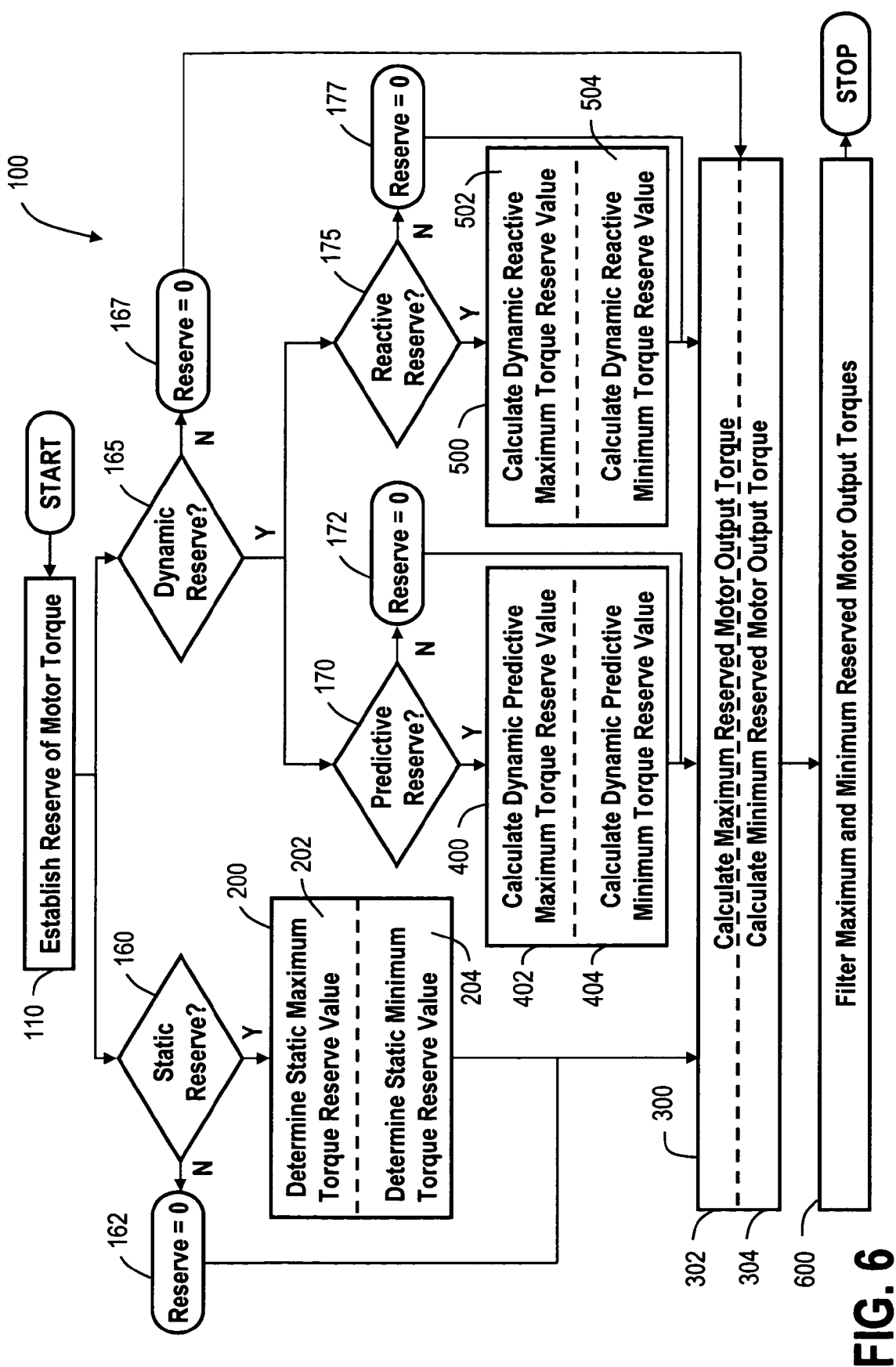
FIG. 6 is a flowchart illustrating the steps of the method of the present invention.

Referring to FIGS. 5 and 6, the present invention comprises a method 100 of operating a vehicle powertrain system, such as powertrain system 11, comprising an electric motor and transmission, the electric motor operably and selectively coupled to the transmission and adapted to provide an output torque contribution thereto, the electric motor having a predetermined maximum motor output torque and a predetermined minimum motor output torque which are used to determine a range of permissible control points for at least one transmission control parameter, comprising: establishing a motor torque reserve by performing at least one of decreasing the predetermined maximum motor output torque to a maximum reserved motor output torque and increasing the minimum motor output torque to a minimum reserved motor output torque, wherein the maximum reserved motor output torque and the minimum reserved motor output torque are used in place of the predetermined maximum motor output torque and the predetermined minimum motor output torque, respectively, to determine the range of permissible control points for the at least one transmission control parameter. It is believed that method 100 could be implemented in hardware, such as by using various combinations of logic and computational components, or by using a combination of hardware and software. However, method 100 preferably comprises and is implemented as a program, routine, subroutine, computer algorithm or other instructions implemented as part of the executable computer code and data structures of a controller of powertrain system 11, such as system controller 43. The instructions represented thereby are, of course, executed as a part of a much larger group of programs, instruction sets, routines, subroutines and other computer processes carrying out the various control and diagnostic function of the powertrain previously described.

While method 100 is illustrated and explained herein primarily with regard to a powertrain system, such as powertrain system 11, having two electric machines, such as motor 56 and motor 72, it is also applicable to a system having only one electric machine, and is believed to be equally applicable and extensible by one of ordinary skill to a system having more than two motors. The means for operatively and selectively coupling the motor, such as motor A or motor B, and transmission, such as transmission 10, in such embodiments may comprise a clutch, or plurality of clutches depending on the number of motors, as described herein, or any of a number of other known torque transfer devices or coupling means, including various forms of slipping and non-slipping clutches, torque converters and various forms of brakes. The electric motor is operatively and selectively coupled to the transmission such that it is adapted to provide a motor output torque contribution to the transmission through the coupling means, such as a clutch, in the manner described herein. The electric motor has a predetermined maximum motor output torque, referred to herein as Tx_max, and a predetermined minimum motor output torque, referred to herein as Tx_min, which are used to determine a range of permissible control points for at least one transmission control parameter (e.g., To, Ti, No, Ni, No_dot and Ni_dot) as described above. The use of Tx herein is intended to generally designate an electric motor, and is also used herein in instances wherein a step or series of steps is applied to each of motor A or motor B.

Referring again to FIGS. 5 and 6, method 100 comprises a step of establishing 110 a motor torque reserve by performing at least one of decreasing the predetermined maximum motor output torque to a maximum reserved motor output torque and increasing the minimum motor output torque to a minimum reserved motor output torque, wherein the maximum reserved motor output torque and the minimum reserved motor output torque are used in place of the predetermined maximum motor output torque and the predetermined minimum motor output torque, respectively, to determine the range of permissible control points for the at least one transmission control parameter. Referring to FIG. 5, the concept of establishing 100 a motor torque reserve is illustrated with regard to a two motor powertrain system, such as powertrain system 11, having motor A and motor B. Ta_max 120, Ta_min 125, Tb_max 130 and Tb_min 135 which are the predetermined maximum and minimum motor torque limits and which define the solution space in Ta and Tb with regard to certain exemplary present transmission operating parameters, such as conditions or points in Ni, No, Ni_dot and No_dot, as described herein. Within this motor torque solution space there also exists several other parameter lines of constant values which are not shown in FIG. 5, but which are illustrated in FIG. 4, including a plurality of lines of constant battery power, Pbat, a plurality of lines of constant output torque, To, and lines of constant input torque, Ti. The total motor torque reserve, referred to herein simply as the motor torque reserve, may comprise a plurality of distinct types of motor torque reserve in various combinations. The motor torque reserve establishes new operating limits for the motors which replace Ta_max 120, Ta_min 125, Tb_max 130 and Tb_min 135 with reserved limits Ta_max_res 140, Ta_min_res 145, Tb_max_res 150 and Tb_min_res 155, and the total motor torque reserve is illustrated by the shaded regions located between the predetermined motor torque limits and the reserved limits. The two general types of motor torque reserve are a static motor torque reserve 160 (as illustrated by shaded region 160), and a dynamic motor torque reserve 165 (as illustrated by the sum of shaded regions 170 and 175). Dynamic torque reserve 165 may comprise a plurality of constituent dynamic reserves that fall into two general categories, namely predictive dynamic reserves, an example of which is illustrated as predictive dynamic reserve 170, and reactive dynamic reserves, an example of which is illustrated as reactive dynamic reserve 175. The various types of reserves and their uses are described further below. As also illustrated in FIG. 5, the amount of the total motor torque reserve is also preferably limited at all times by a boundary defined by a maximum reserved output torque threshold for motor A, Ta_max_res_limit 180, a minimum reserved output torque threshold for motor A, Ta_min_res_limit 185, a maximum reserved output torque threshold for motor B, Tb_max_res_limit 190 and a minimum reserved output torque threshold for motor B, Tb_min_res_limit 195, which together define region 197. Thus, the maximum reserved motor output torques for motor A and motor B must be greater than or equal to Ta_max_res_limit 180 and Tb_max_res_limit 190, respectively, and the minimum reserved motor output torques for motor A and motor B must be less than or equal to Ta_min res_limit 185 and Tb_min_res_limit 195, respectively. These limits may be the same or different (as illustrated) for each of the respective maximums and minimums associated with motor A and motor B. The imposition of these limits assures that a minimum valid torque solution space in Ta and Tb exists at all times during the operation of motor A and motor B.

A static motor torque reserve, such as static motor torque reserve 160, is simply a fixed motor torque reserve that does not vary as a function of time or as a function of any of a number of vehicle parameters, transmission dynamic parameters or environmental parameters. One embodiment of static motor torque reserve 160 is illustrated in FIG. 5 by the shaded region adjacent the predetermined motor torque limits. Static motor torque reserve 160 may be established using a static reserve value of motor torque. This static reserve value is preferably a fixed value of motor torque (e.g., 20 n-m), but may also be expressed in other forms, such as, for example, as the negative of the value illustrated (e.g., −20 n-m) or as a percentage of the predetermined maximums and minimums (e.g., 90% of the maximum or minimum). Where the static reserve value is a fixed value of motor torque, its use may comprise subtracting it from the predetermined maximum motor torques, Ta_max and Tb_max, and by adding it to the predetermined minimum motor torques, Ta_min and Tb_min. The static reserve value may also be different for each of the maximum and minimum motor torques, such that static motor torque reserve space is not symmetric with respect to the predetermined motor torque limits. When the powertrain system is operating within the reserved motor torque limits determined using the respective static reserve values, the Ta and Tb solution space defined thereby effectively has a buffer of available motor torque space (static motor torque reserve 160), which provides for more robust control of powertrain system 11 and enables it to respond to desired or actual changes in the transmission dynamic parameters with control actions which include the application of available motor torque from the electric machines.

A dynamic motor torque reserve 165 is simply a motor torque reserve that changes in conjunction with the operation of the vehicle powertrain system 11, particularly the transmission, such as transmission 10. Dynamic motor torque reserve 165 typically may change as a function of time, but could also change as a function of many other parameters, such as, for example, operating temperature, voltage, or other parameters associated with the powertrain system, including dynamic parameters associated with the transmission, such as those described herein. For example, an otherwise static reserve may be adapted to change as a function of time, temperature and operating voltage, or in response to various diagnostics which are adapted to assess the condition of a motor, or other parameters, or combinations thereof, and thus would comprise a form of dynamic motor torque reserve 165. In another example, dynamic motor torque reserve may have no fixed basis and may be purely dynamic in nature, changing constantly in conjunction with the operation of the vehicle as a function of dynamic parameters associated with the vehicle, transmission, or environment, or combinations thereof. As described above, dynamic motor torque reserve 165 generally may be divided into two general categories of dynamic reserve, predictive dynamic motor torque reserves 170 and reactive dynamic motor torque reserves 175, also referred to herein as predictive reserves 170 and reactive reserves 175.

Predictive reserves 170 are dynamic reserves which are established in anticipation of a future event, condition, change or other future occurrence in conjunction with the operation of the vehicle powertrain system, particularly the transmission. One embodiment of a predictive dynamic torque reserve 170 is a reserve that is established in anticipation of or based on the prediction of a transmission shift (i.e., a Mode 1/Mode 2 shift or a Mode 2/Mode 1 shift). An example of a predictive reserve is described herein and illustrated with regard to FIGS. 7–16. Predictive reserve 170 may be established in any suitable manner, but will preferably comprise the determination of a predictive reserve value which is used to change the predetermined motor torque limits. The predictive dynamic reserve value will preferably be determined in real-time or if not in real-time, in a manner that permits effective establishment of a predictive reserve and control of the transmission. The predictive reserve value is preferably a dynamic value of motor torque (e.g., a changing value expressed in newton-meters), but may alternately also be expressed in other forms, such as, for example, as a negative value of motor torque or as a percentage of the predetermined maximums and minimums (e.g., 90% of the maximum or minimum). Where the predictive reserve value is a dynamic value of motor torque, its use may comprise subtracting it from the predetermined maximum motor torques, Ta_max and Tb_max, and by adding it to the predetermined minimum motor torques, Ta_min and Tb_min.

Reactive reserves 175 are dynamic reserves which are established in response to an existing or past event, condition, change or other occurrence in conjunction with the operation of the vehicle powertrain system, particularly the transmission. One embodiment of a reactive dynamic torque reserve 175 is a reserve that is established in response to an input speed error. An example of a reactive reserve is described herein and illustrated with regard to FIG. 17. Reactive reserve 175 may be established in any suitable manner, but will preferably comprise the determination of a reactive reserve value which is used to change the predetermined motor torque limits. The reactive dynamic reserve value will preferably be determined in real-time or if not in real-time, in a manner that permits effective establishment of a reactive reserve and control of the transmission. The reactive reserve value is preferably a dynamic value of motor torque (e.g., a changing value expressed in newton-meters), but may alternately also be expressed in other forms, such as, for example, as a negative value of motor torque or as a percentage of the predetermined maximums and minimums (e.g., 90% of the maximum or minimum). Where the reactive reserve value is a dynamic value of motor torque, its use may comprise subtracting it from the predetermined maximum motor torques, Ta_max and Tb_max, and by adding it to the predetermined minimum motor torques, Ta_min and Tb_min.

The various types of motor torque reserves may be utilized separately or in any combination with one another. For example, motor torque reserve may comprise only a static motor torque reserve. In another example, motor torque reserve may comprise a static motor torque reserve 160 in combination with a dynamic motor torque reserve 165, which may in turn comprise either a predictive reserve, or a reactive reserve, or both. In yet another example, the motor torque reserve may comprise only a dynamic reserve 165, which again may comprise either a predictive reserve 170, or a reactive reserve 175, or both. Referring to FIG. 6, the permutations and combinations of static motor torque reserve and dynamic motor torque reserve which may be utilized in conjunction with method 100 to establish a total motor torque reserve are illustrated. According to FIG. 6, method 100 comprising a step of establishing 110 a motor torque reserve by performing at least one of decreasing the predetermined maximum motor output torque to a maximum reserved motor output torque and increasing the minimum motor output torque to a minimum reserved motor output torque, wherein the maximum reserved motor output torque and the minimum reserved motor output torque are used in place of the predetermined maximum motor output torque and the predetermined minimum motor output torque, respectively, to determine the range of permissible control points for the at least one transmission control parameter, requires the selection and implementation of at least one of a static reserve 160 or dynamic reserve 165. As discussed, method 100 may also comprise the selection of both.

Referring to FIG. 6, if static reserve 160 is selected, method 100 comprises determining 200 at least one of a static maximum reserve value 202 and a static minimum reserve value 204, and may also include the determination of both. If no static reserve is desired, the static maximum reserve value 202 and a static minimum reserve value 204 may be set to zero in block 162 and passed to block 300 as indicated. It should be noted that static reserve 160 may comprise the aggregate of a plurality of individual static reserves having their own static reserve maximum and/or minimum values which may be related to different events or conditions for which a static reserve is desired.

Referring again to FIG. 6, if dynamic reserve 165 is selected, method 100 proceeds to block 170 and block 175. If no dynamic reserve is desired, all values associated with the dynamic reserve value described below may be set to zero in block 167 and passed to block 300 as indicated. It should be noted that dynamic reserve 165 may comprise the aggregate of a plurality of individual dynamic reserves having their own dynamic reserve maximum and/or minimum values which may be related to different events or conditions for which a dynamic reserve is desired, as explained further below.

If predictive dynamic reserve 170 is selected, method 100 comprises calculating 400 at least one of dynamic predictive maximum torque reserve value 402 and dynamic predictive minimum torque reserve value 404, and may also include the determination of both. If no predictive dynamic reserve is desired, dynamic predictive maximum reserve value 402 and dynamic predictive minimum reserve value 404 may be set to zero in block 172 and passed to block 300 as indicated. It should be noted that dynamic predictive reserve 170 may comprise the aggregate of a plurality of individual dynamic predictive reserves having their own dynamic predictive reserve maximum and/or minimum values which may be related to different events or conditions for which a dynamic predictive reserve is desired.

Referring again to FIG. 6, if reactive dynamic reserve 175 is selected, method 100 comprises calculating 500 at least one of dynamic reactive maximum torque reserve value 502 and dynamic reactive minimum torque reserve value 504, and may also include the determination of both. If no reactive dynamic reserve is desired, dynamic reactive maximum reserve value 502 and dynamic reactive minimum reserve value 504 may be set to zero in block 177 and passed to block 300 as indicated. It should be noted that dynamic reactive reserve 175 may comprise the aggregate of a plurality of individual dynamic reactive reserves having their own dynamic reactive reserve maximum and/or minimum values which may be related to different events or conditions for which a dynamic reactive reserve is desired.

The method as illustrated by the flowchart of FIG. 6 may not necessarily be a preferred embodiment with regard to implementing a real-time motor torque reserve, as the decision to implement a particular type of motor torque reserve, such as the decisions as to whether to implement static reserve 160 or dynamic reserve 165, or the particular types of dynamic reserve, may not necessarily be performed in conjunction with real-time control. The choices represented by decision blocks 160, 165, 170 and 175 may comprise one time design decision for a particular vehicle design. These choices are then reflected by selection a specific combination of static reserves 160 and dynamic reserves 165, which will preferably be implemented in a particular vehicle powertrain system, such as powertrain system 11, as computer code as described herein which reflects these choices, but will not actually go through the selection process in conjunction with the real-time control. In the case where the vehicle powertrain, such as vehicle powertrain 11, includes more than one electric motor which is operably and selectively coupled to transmission as described herein, method 100 may be utilized to establish a motor torque reserve for each of the electric motors, such as motors A and B, or if more than two motors are utilized, for as many of the motors as desired.

Referring again to FIG. 6, once the respective torque reserve values have been established, the step of calculating 300 total motor torque reserve, comprising at least one of calculating a maximum reserved motor output torque 302 and calculating a minimum reserved motor output torque 304, is performed. One embodiment for calculating 300 is illustrated with reference to the two motor system of vehicle powertrain system 11, comprising motor A and motor B, each having a static reserve and a dynamic reserve comprising both a predictive reserve and a reactive reserve, by the following equations:

$$Ta\_min\_res = \min(Ta\_min + (cal\_Ta\_min\_stat\_res + Ta\_min\_dyn\_res), -cal\_min\_Ta) \qquad (1)$$

$$Ta\_max\_res = \min(Ta\_max - (cal\_Ta\_max\_stat\_res + Ta\_max\_dyn\_res), cal\_max - Ta) \qquad (2)$$

$$Tb\_min\_res = \min(Tb\_min + (cal\_Tb\_min\_stat\_res + Tb\_min\_dyn\_res), -cal\_min\_Tb) \qquad (3)$$

$$Tb\_max\_res = \min(Tb\_max - (cal\_Tb\_max\_stat\_res + Tb\_max\_dyn\_res), cal\_max\_Tb) \qquad (4)$$

where:

cal_Ta_min_stat_res: is a fixed calibration comprising the static minimum torque reserve value 204 for motor A;

cal_Ta_max_stat_res: is a fixed calibration comprising the static maximum torque reserve value 202 for motor A;

cal_Tb_min_stat_res: is a fixed calibration comprising the static minimum torque reserve value 204 for motor B;

cal_Tb_max_stat_res: is a fixed calibration comprising the static maximum torque reserve value 202 for motor B;

Ta_min_dyn_res: is a the calculated dynamic minimum reserve value for motor A;

Ta_max_dyn_res: is a the calculated dynamic maximum reserve value for motor A;

Tb_min_dyn_res: is a the calculated dynamic minimum reserve value for motor B;

Tb_max_dyn_res: is a the calculated dynamic maximum reserve value for motor B;

−cal_min_Ta: is a calibration comprising the minimum motor torque reserve limit for motor A, Ta_min_res_limit 185;

cal_max_Ta: is a calibration comprising the maximum motor torque reserve limit for motor A, Ta_max_res_limit 180;

−cal_min_Tb: is a calibration comprising the minimum motor torque reserve limit for motor B, Tb_min res_limit 195; and cal_max_Tb: is a calibration comprising the maximum motor torque reserve limit for motor B; Tb_max_res_limit 190.

Referring to FIGS. 5 and 6, equations 1–4 permit the calculation of Ta_max_res 140, Ta_min_res 145, Tb_max_res 150 and Tb_min_res 1 the establishment the total motor torque reserve comprising static reserve 160 and dynamic reserve 165. In one embodiment of the two motor system described herein, dynamic reserve 165 may be calculated from the following equations:

$$Ta\_min\_dyn\_res = Ta\_min\_NDR + Ta\_min\_CLR; \quad (5)$$

$$Ta\_max\_dyn\_res = Ta\_max\_NDR + Ta\_max\_CLR; \quad (6)$$

$$Tb\_min\_dyn\_res = Tb\_min\_NDR + Tb\_min\_CLR; \quad (7)$$

$$Tb\_max\_dyn\_res = Tb\_max\_NDR + Tb\_max\_CLR; \quad (8)$$

where:

Ta_min_NDR: is a calculated dynamic predictive minimum torque reserve value 404 for motor A related to changes in the transmission dynamic parameter Ni_dot;

Ta_max_NDR: is a calculated dynamic predictive maximum torque reserve value 402 for motor A related to changes in the transmission dynamic parameter Ni_dot;

Tb_min_NDR: is a calculated dynamic predictive minimum torque reserve value 404 for motor B related to changes in the transmission dynamic parameter Ni_dot;

Tb_min_NDR: is a calculated dynamic predictive maximum reserve value 402 for motor B related to changes in the transmission dynamic parameter Ni_dot;

Ta_min_CLR: is a calculated dynamic reactive minimum torque reserve value 504 for motor A related to changes in the transmission dynamic parameter comprising an input speed error between a desired input speed of the transmission and the actual or measured input speed, as further described herein;

Ta_max_CLR: is a calculated dynamic reactive maximum torque reserve value 502 for motor A related to changes in the transmission dynamic parameter comprising the input speed error;

Tb_min_CLR: is a calculated dynamic reactive minimum torque reserve value 504 for motor B related to changes in the transmission dynamic parameter comprising the input speed error;

Tb_max_CLR: is a calculated dynamic reactive maximum torque reserve value 502 for motor B related to changes in the transmission dynamic parameter comprising the input speed error.

Once the value of Ta_max_res 140, Ta_min_res 145, Tb_max_res 150 and Tb_min_res 155 have been calculated, it is preferred that they be filtered, such as by the application of a rate limiter or a first order filter, as is well known to those of ordinary skill and illustrated by block 600 in FIG. 6.

Figure 7:
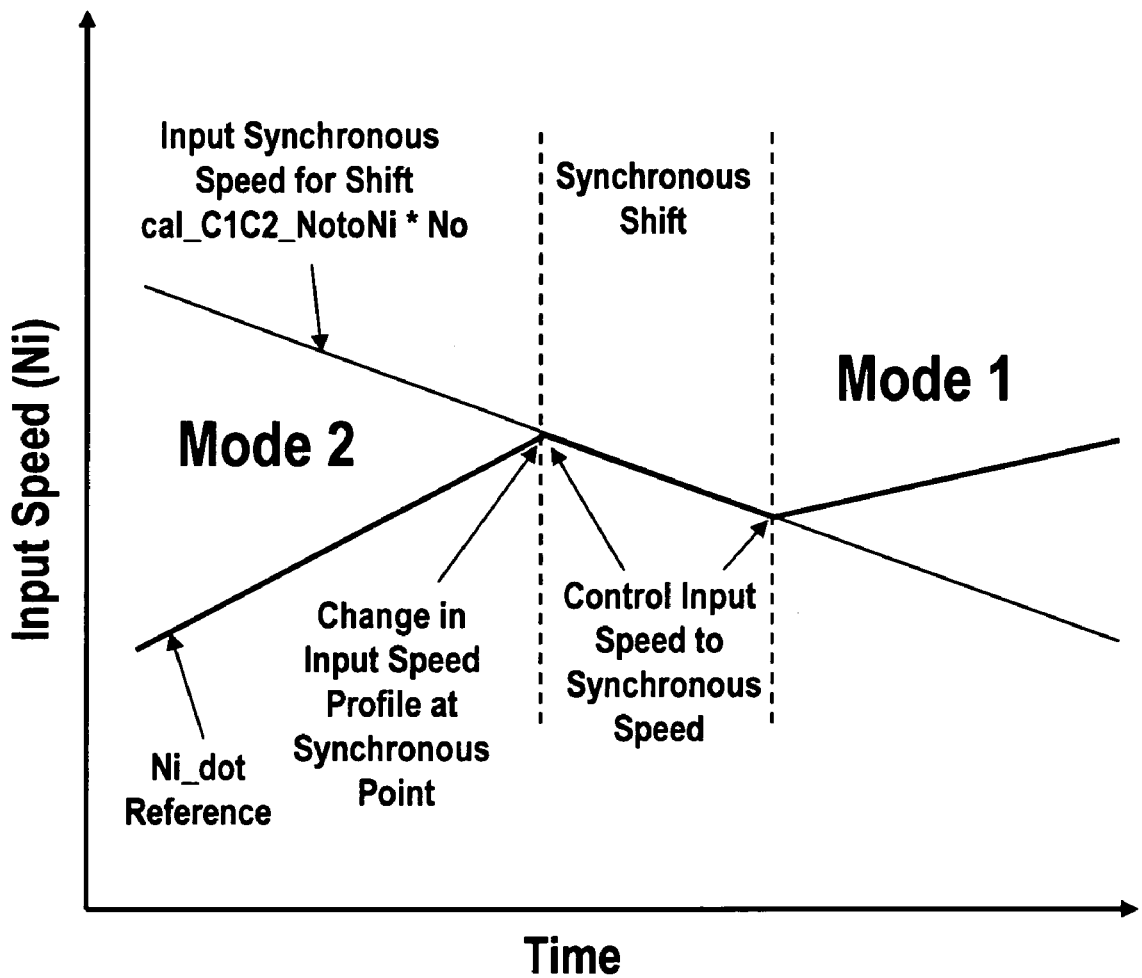
FIG. 7 is a schematic illustration of mode 2 to mode 1 shift event for which a dynamic reserve of motor torque according to the method of the present invention may be utilized.
Figure 8:
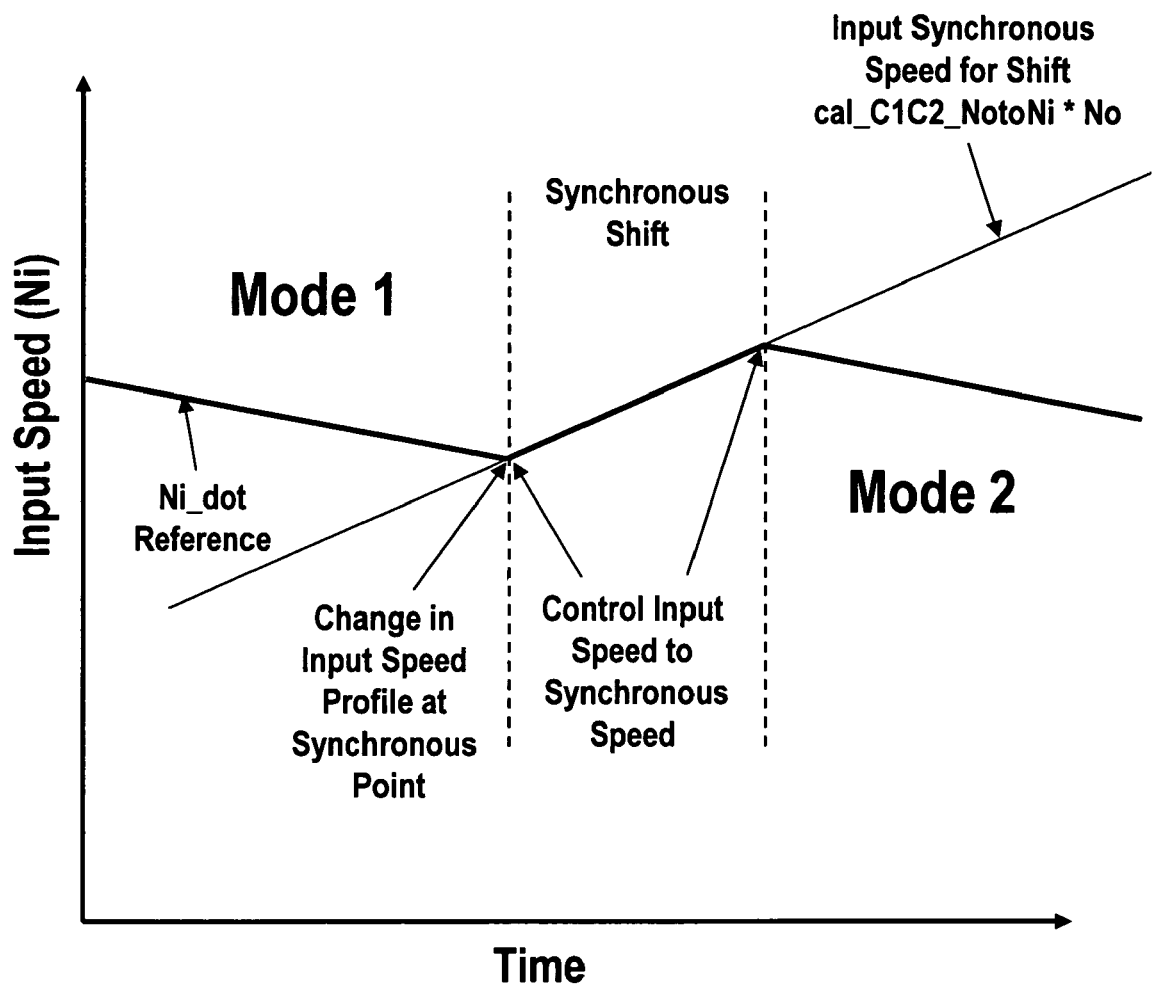
FIG. 8 is a schematic illustration of mode 1 to mode 2 shift event for which a dynamic reserve of motor torque according to the method of the present invention may be utilized.

As noted above, it is believed that any number of operating conditions associated with EVT powertrain systems may exist wherein it is possible in real-time to predict a future requirement for motor torque, and to then establish a dynamic predictive motor torque reserve to ensure that the requirement can be met. One embodiment of a dynamic predictive motor torque reserve is related to shifting the transmission 10 of vehicle powertrain system 11 from Mode 2 to Mode 1, or from Mode 1 to Mode 2, as described herein. FIGS. 7 and 8 are graphical representations of a typical Mode 2 to Mode 1 and Mode 1 to Mode 2 shift, respectively. FIG. 7, for example, shows system operation in Mode 2 approaching the shift point for a synchronous shift to Mode 1. When the input speed profile (Ni_dot_Reference) reaches the synchronous point, it changes to match the input synchronous speed profile line (No*GR), where the gear ratio (GR) is represented by cal_C1C2_NotoNi. In order to accomplish the synchronous shift, the system needs to have the dynamic motor torque reserve necessary to pull Ni_dot_Reference down to the new rate by the time it reaches the synchronous point for Mode 1 operation, referred to herein as Ni_dot reserve (NDR). Applicants have determined that it is possible to predict an upcoming shift and establish the necessary motor torque reserve as a function of various transmission dynamic parameters, as described below. The input acceleration dynamic torque reserve is predictive in nature. From an overall view, it plans ahead to ensure that at the time the predicted synchronous shift does occur, the motors are ensured to have the reserve torque necessary to change the input speed profile near and at the synchronization point. The reserve provides for better control of input speed and for output torque continuity through the shift.

The amount of motor torque reserve necessary associated with a shift may be calculated using the system equations of the EVT for Ta and Tb. The model of the EVT includes steady state and dynamic EVT system parameters. In its basic form—suitably arranged for machine torque resolution—the model is represented as follows:

$$\begin{bmatrix} Ta \\ Tb \end{bmatrix} = [K1] \begin{bmatrix} Ti \\ To \\ Ni\_dot \\ No\_dot \end{bmatrix} \quad (9)$$

where:
Ta is motor A torque;
Tb is motor B torque;
Ti is EVT input torque;
To is EVT output torque;
Ni_dot is EVT input acceleration;
No_dot is EVT output acceleration; and
[$K_1$] is a 2×4 matrix of parametric values determined by the hardware gear and shaft interconnections and estimated hardware inertias applicable to the current drive range.

An additional torque error term is preferably incorporated into the model yielding the preferred form represented as follows:

$$\begin{bmatrix} Ta \\ Tb \end{bmatrix} = \begin{bmatrix} K_{11} & K_{12} & K_{13} & K_{14} & K_{15} \\ K_{21} & K_{22} & K_{23} & K_{24} & K_{25} \end{bmatrix} \begin{bmatrix} Ti \\ To \\ Ni\_dot \\ No\_dot \\ Ucl \end{bmatrix} \quad (10)$$

where, as distinguished from the model as represented in equation (10) herein above:
Ucl is a measured torque error term that is based upon dynamic conditions, e.g. input speed error; and
The K matrix of parametric values is a 2×5 matrix which further includes parameters for scaling the measured torque error term Ucl to modify the motor torques Ta and Tb.

Further, there is a separate K matrix for Mode 1 and Mode 2. In this case, the parametric values for Mode 1 and Mode 2 include:
Mode 1:
  $K_{13}$=cal_Mode1_Nidot2Ta
  $K_{23}$=cal_Mode1_Nidot2Tb
Mode 2:
  $K_{13}$=cal_Mode2_Nidot2Ta
  $K_{23}$=cal_Mode2_Nidot2Tb Additional details respecting the measured torque error term and preferred method for determination thereof is found in related, commonly assigned, co-pending U.S. patent application Ser. No. 10/686,511 filed on Oct. 14, 2003.

Various powertrain model parameters are measured or otherwise predetermined. For a given Mode, output speed, No, and input speed, Ni, can be derived from sensed and filtered motor speeds, Na and Nb, which are known through sensing, or derived through the motor control phase information. The input speed, Ni, and output speed, No, can be derived from motor speeds in accordance with the following known coupling constraint equation:

$$\begin{bmatrix} Ni \\ No \end{bmatrix} = [K3] \begin{bmatrix} Na \\ Nb \end{bmatrix} \quad (11)$$

where
Na is motor A speed,
Nb is motor B speed,
Ni is EVT input speed,
No is EVT output speed, and
[$K_3$] is a 2×2 matrix of parametric values determined by the hardware gear and shaft interconnections.

With respect to the calculation of predictive motor torque reserve associated with the shift, the output speed acceleration, No_dot, is preferably determined in accordance with the derived output speed, No. The input acceleration, Ni_dot, is preferably the desired rate of change of input speed based on derived input speed, Ni, and profile/rate limit control as taught in related, commonly assigned, co-pending U.S. patent application Ser. No. 10/686,511. In this case, the desired rate of change of input speed, Ni_dot, is represented by the profiles illustrated in each of FIGS. 7 and 8 as Ni_dot_Reference.

The preferred implementation of the synchronous shift is to provide a smooth transition through the shift without step changes in the transmission dynamic parameters. This is known to provide drivability characteristics which are preferred by vehicle operators. In order to achieve a smooth shift, all of the inputs other than Ni_dot, including Ti, To, No_dot, and Ucl, must remain smooth (i.e., preferably not changing, or if changing, not changing significantly) while Ni_dot changes. This is particularly important with regard to the output torque, To. In order for this to happen, there has to be a torque reserve present in Ta and Tb to accommodate that change in Ni_dot in such a way that Ta and Tb can change freely to the new values corresponding to the new Ni_dot without hitting one of their real motor torque constraints. If a motor torque constraint were to be encountered during the shift, the system would have to respond by immediately changing the allowable output torque. Such changes are undesirable as such changes in output torque are generally associated with undesirable vehicle performance. This holds true for both Mode 1 and Mode 2 operation of the EVT.

Figure 9:
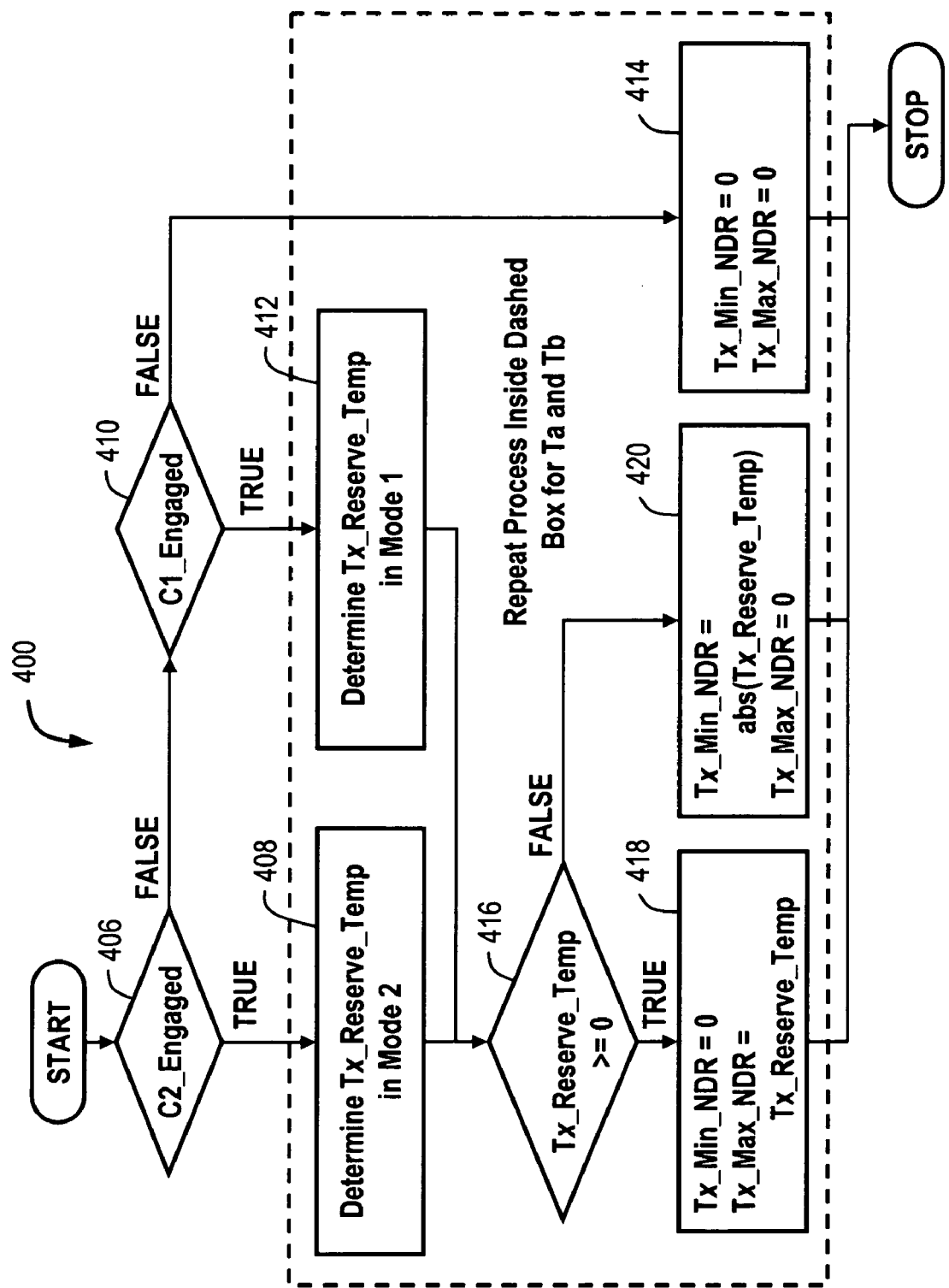
FIG. 9 is a block diagram of a method for calculating a predictive Ni_dot reserve in accordance with block 400 of FIG. 6.

FIG. 9 illustrates a routine comprising a series of steps for calculating 170 a dynamic predictive motor torque reserve in order to establish a reserve of motor torque for a predict shift of the EVT. FIG. 9 utilizes the nomenclature Tx to indicate that it may be used to calculate the motor torque reserve for motor A and motor B. The steps comprise calculating both the dynamic predictive maximum torque reserve value 402 and the dynamic predictive minimum torque reserve value 404. The steps may be generally characterized as calculating the predictive reserve value as a function of at least one transmission dynamic parameter. It is preferred that the transmission dynamic parameter comprises the desired input acceleration and the output acceleration. The steps may also be generally characterized as comprising calculating an input acceleration maximum torque reserve value 402 and an input acceleration minimum torque reserve value 404 as a function of a predicted future change in an input acceleration of the transmission, as described further below. The nomenclature used in FIG. 9 refers to a temporary or precursor value of the motor torque reserve, Tx_Reserve_Temp, which is tested to determine the value of Tx_Max_NDR and Tx_Min_NDR. Referring to FIG. 9, the routine starts with decision block 406 which tests to determine whether C2 is engaged (Mode 2 operation) which may be determined by the status of pressure switches and the slip speed associated with the clutch. If the result of the test of block 406 is true, the routine passes to block 408 to determine the value of Tx_Reserve_Temp in Mode 2, and if false, passes to decision block 410 which tests to determine whether C1 is engaged (Mode 1 operation), which may also be determined by the status of pressure switches and the slip speed associated with the clutch. From decision block 410, if the test is true, the routine proceeds to block 412 to determine the value of Tx_Reserve_Temp in Mode 1, and if false (i.e., the transmission is in a neutral state, passes to block 414 where the values of Tx_Max_NDR and Tx_Min_NDR are both set equal to zero (i.e., because no reserve is required). If the routine passes to one of blocks 408 or 412, the routine passes to block 416 to test whether the value of Tx_Reserve_Temp is greater than or equal to zero. If the result of the test is true, the routine passes to block 418, where the value of Tx_Max_NDR is set equal to the value of Tx_Reserve_Temp and Tx_Min_NDR is set equal to zero. If the result of the test is false, the routine passes to block 420, where the value of Tx_Min_NDR is set equal to the absolute value of Tx_Reserve_Temp and Tx_Max_NDR is set equal to zero. Thus, if the value of Tx_Reserve_Temp is positive or zero, the routine calculates an input acceleration maximum torque reserve value 402, and if it is negative, the routine calculates input acceleration minimum torque reserve value 404.

Figure 10:
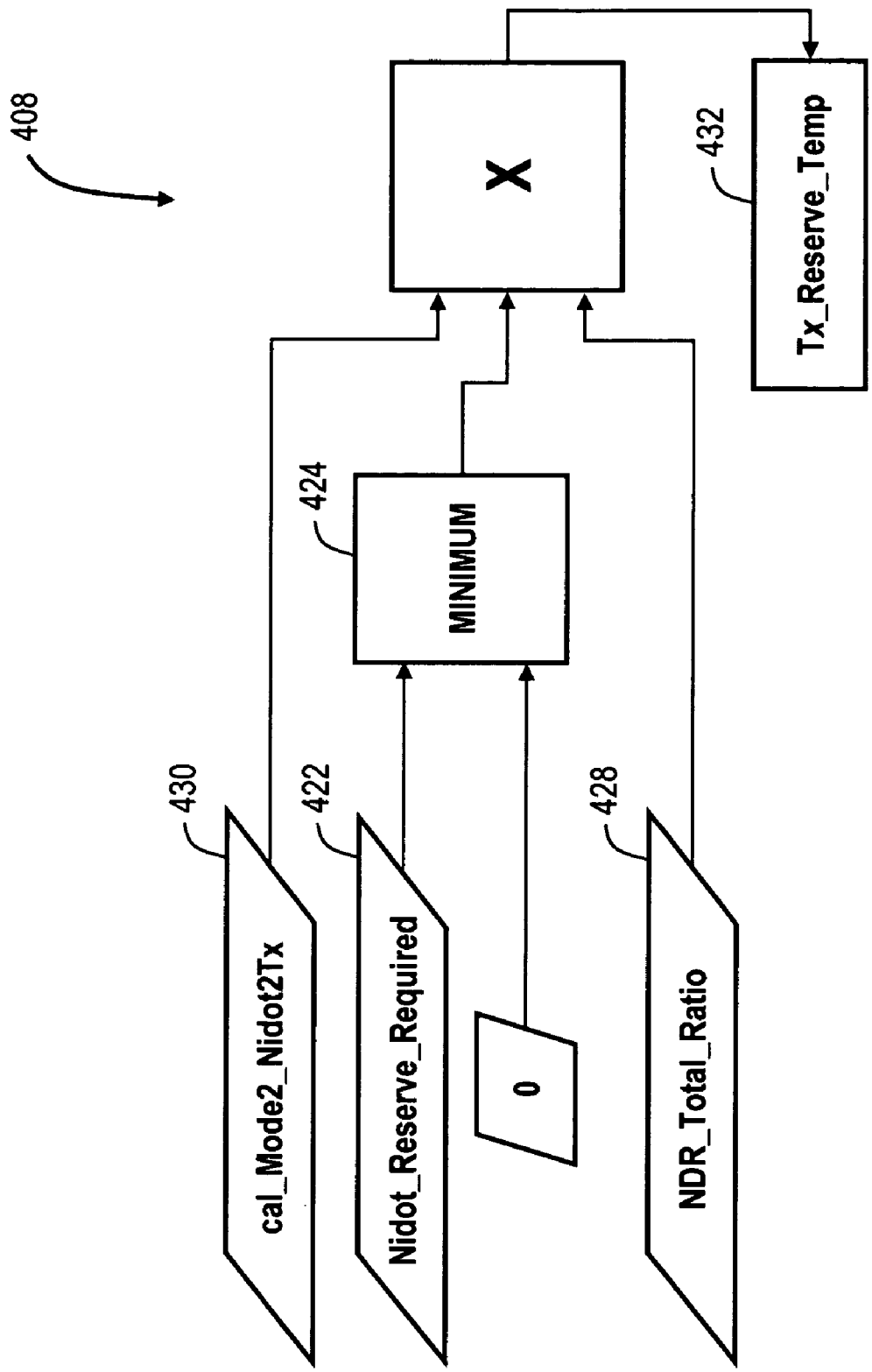
FIG. 10 is block diagram further illustrating block 408 of FIG. 9.
Figure 11:
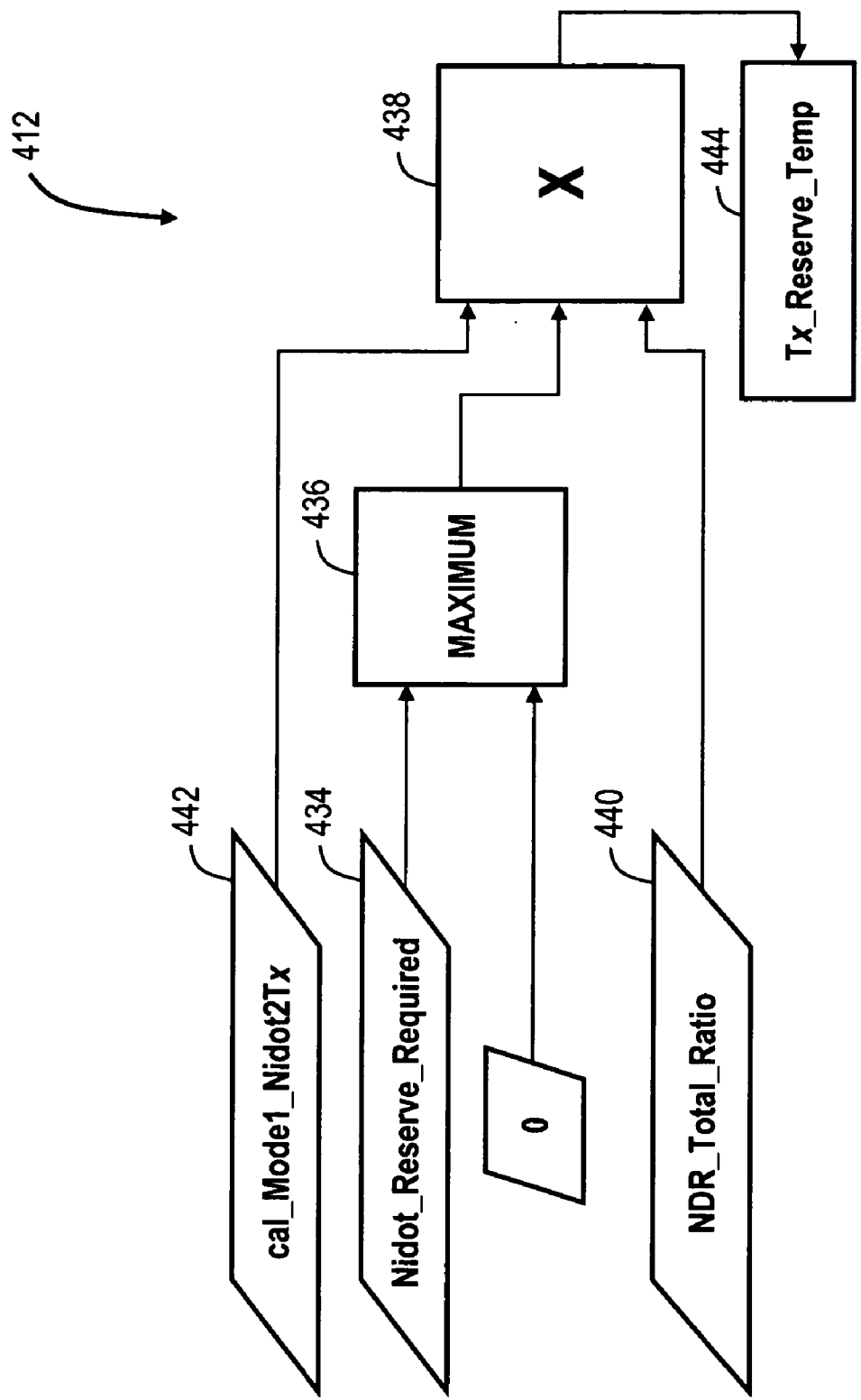
FIG. 11 is block diagram further illustrating block 412 of FIG. 9.

FIGS. 10 and 11 illustrate the steps of a routine for determining or Tx_Reserve_Temp in Mode 2 and Mode 1, respectively. Generally, the routine calculates an amount of motor torque reserve required for each of motors A and B for a predicted future shift event requiring a change in input acceleration, Ni_dot, and factors the amount of the reserve by a prediction factor having a value that may be described as generally increasing as the probability of the change occurring increases and generally decreasing as the probability of the change occurring decreases, wherein the value of the prediction factor varies between zero and one. The prediction factor, NDR_Total_Ratio, also may be described as generally relating to the predicted time of occurrence of the shift, generally increasing as the predicted time remaining to the shift decreases and generally decreasing as the predicted time remaining to the shift decreases.

Referring to FIG. 10, the motor torque reserve required for the predicted future shift from Mode 2 is calculated as the variable, Ni_dot_Reserve_Required, represented by block 422.

Ni_dot_Reserve_Required defines the change in targeted input acceleration (from actual to what will be required at synchronization). The value of Ni_dot_Reserve_Required may be calculated as shown in Equation 12:

$$Ni\_dot\_\text{Reserve\_Required}=cal\_C1C2\_NotoNi*No\_dot-Ni\_dot\_\text{Reference}, \quad (12)$$

where:

cal_C1C2_NotoNi is the calibration associated with the gear ratio, GR, as illustrated in FIG. 7 and FIG. 8 for Mode 2/Mode 1 and Mode 1/Mode 2 shifts, respectively.

The value of Ni_dot_Reserve_Required utilized for the routine is selected as the minimum of the value calculated in block 422 and 0 as illustrated in block 424, and the resulting value of Ni_dot_Reserve_Required is passed to block 426. The prediction factor described above is a calculated value, NDR_Total_Ratio, as illustrated in block 428, which varies between 0 and 1 as described above. The description of the calculation of NDR_Total_Ratio is described below and with reference to FIGS. 12–16. The values of NDR_Total_Ratio, Ni_dot_Reserve_Required and cal_Mode2_Nidot2Tx illustrated in block 430 and described above see above with regard to the K matrix calibrations for Mode 2) are multiplied together as illustrated in block 426, and the resulting value of Tx_Reserve_Temp for Mode 2 operation is passed to block 432.

Similarly, referring to FIG. 11, the motor torque reserve required for a predicted future shift from Mode 1 is calculated as the variable, Ni_dot_Reserve_Required, represented by block 434. The value of Ni_dot_Reserve_Required may be calculated as shown in Equation 12. The value of Ni_dot_Reserve_Required utilized for the routine is selected as the maximum of the value calculated in block 434 and 0 as illustrated in block 436, and the resulting value of Ni_dot_Reserve_Required is passed to block 438. The prediction factor described above is again the calculated value, NDR_Total_Ratio, as illustrated in block 440, which varies between 0 and 1 as described above. The description of the calculation of NDR_Total_Ratio is described below and with reference to FIGS. 12–16. The values of NDR_Total_Ratio, Ni_dot_Reserve_Required and cal_Mode1_Nidot2Tx illustrated in block 442 and described above with regard to the K matrix calibrations for Mode 1) are multiplied together as illustrated in block 438, and the resulting value of Tx_Reserve_Temp for Mode 1 operation is passed to block 444.

Figure 12:
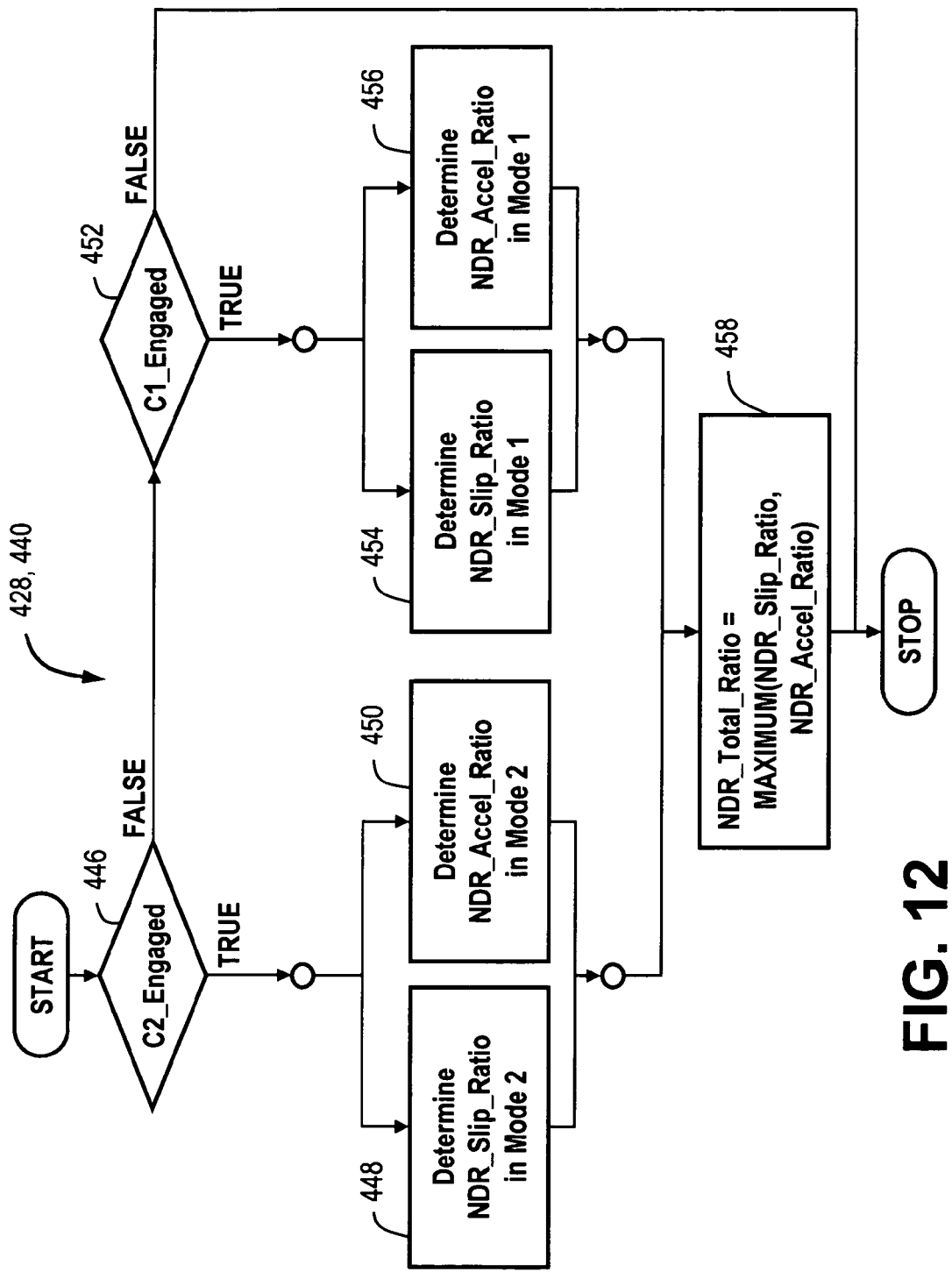
FIG. 12 is block diagram illustrating a routine for calculating the NDR_Total_Ratio.

FIG. 12 illustrates a routine for calculating the value of the NDR_Total_Ratio as illustrated by blocks 428 and 440 of FIGS. 10 and 11, respectively. The NDR_Total_Ratio is determined as a function of two other ratios which enable the prediction of a future shift and a corresponding change in the input acceleration of the transmission, an NDR_Slip_Ratio and an NDR_Accel_Ratio. The NDR_Slip_Ratio is a function of the variable, Slip_Speed, through a calibration look-up table. With reference to Mode 2 operation, the variable Slip_Speed is a measure of a relative slip speed associated with clutch 2 and comprises a measured dynamic parameter of the transmission. At values of Slip_Speed close to zero (near synchronous speed), the NDR_Slip_Ratio can be set to 1; and at large slip speeds, the NDR_Slip_Ratio can be set to zero. The NDR_Accel_Ratio is a function of the variable NDR_Time_to_Sync through a calibration look-up table. At values of NDR_Time_to_Sync close to zero (approaching synchronous speed quickly), the NDR_Accel_Ratio can be set to 1; and at values of NDR_Time_to_Sync which are not approaching zero, the NDR_Accel_Ratio can be set to zero. Referring again to FIG. 12, the routine starts with decision block 446 which tests to determine whether C2 is engaged (Mode 2 operation). If the result of the test of block 446 is true, the routine passes to block 448 to determine the value of the NDR_Slip_Ratio in Mode 2 and to block 450 to determine the NDR_Accel_Ratio in Mode 2, and if false, passes to decision block 452 which tests to determine whether C1 is engaged (Mode 1 operation). From decision block 452, if the test is true, the routine passes to block 454 to determine the value of the NDR_Slip_Ratio in Mode 1 and to block 456 to determine the NDR_Accel_Ratio in Mode 1, and if false, passes to the end of the routine, as neither C1 nor C2 is engaged. If the result of one of decision blocks 446 and 452 is true, the NDR_Slip_Ratio and NDR_Accel_Ratio associated with either Mode 2 or Mode 1 operation are passed to block 458 and the NDR_Total_Ratio is determined as the maximum of the NDR_Slip_Ratio and the NDR_Accel_Ratio. When the NDR_Total_Ratio is 1, the shift is predicted to have a high probability of occurrence such that it may occur at any instant; conversely, when NDR_Total_Ratio is 0, the shift is predicted to have a low probability of occurrence such that it is predicted to be relatively far from occurrence.

FIG. 13 illustrates a routine for the determination of the NDR_Slip_Ratio in Mode 2, as shown in block 448 of FIG. 12. The value of the Slip_Speed is obtained using well-known methods and is illustrated in block 462. The value of the NDR_Slip_Ratio in Mode 2 is then determined from a one dimensional look-up table as shown in block 462. Similarly, FIG. 14 illustrates a routine for the determination of the NDR_Slip_Ratio in Mode 1, as shown in block 454 of FIG. 12. The value of the Slip_Speed is obtained using well-known methods and is illustrated in block 464. The value of the NDR_Slip_Ratio in Mode 1 is then determined from a one dimensional look-up table as shown in block 466.

Figure 15:
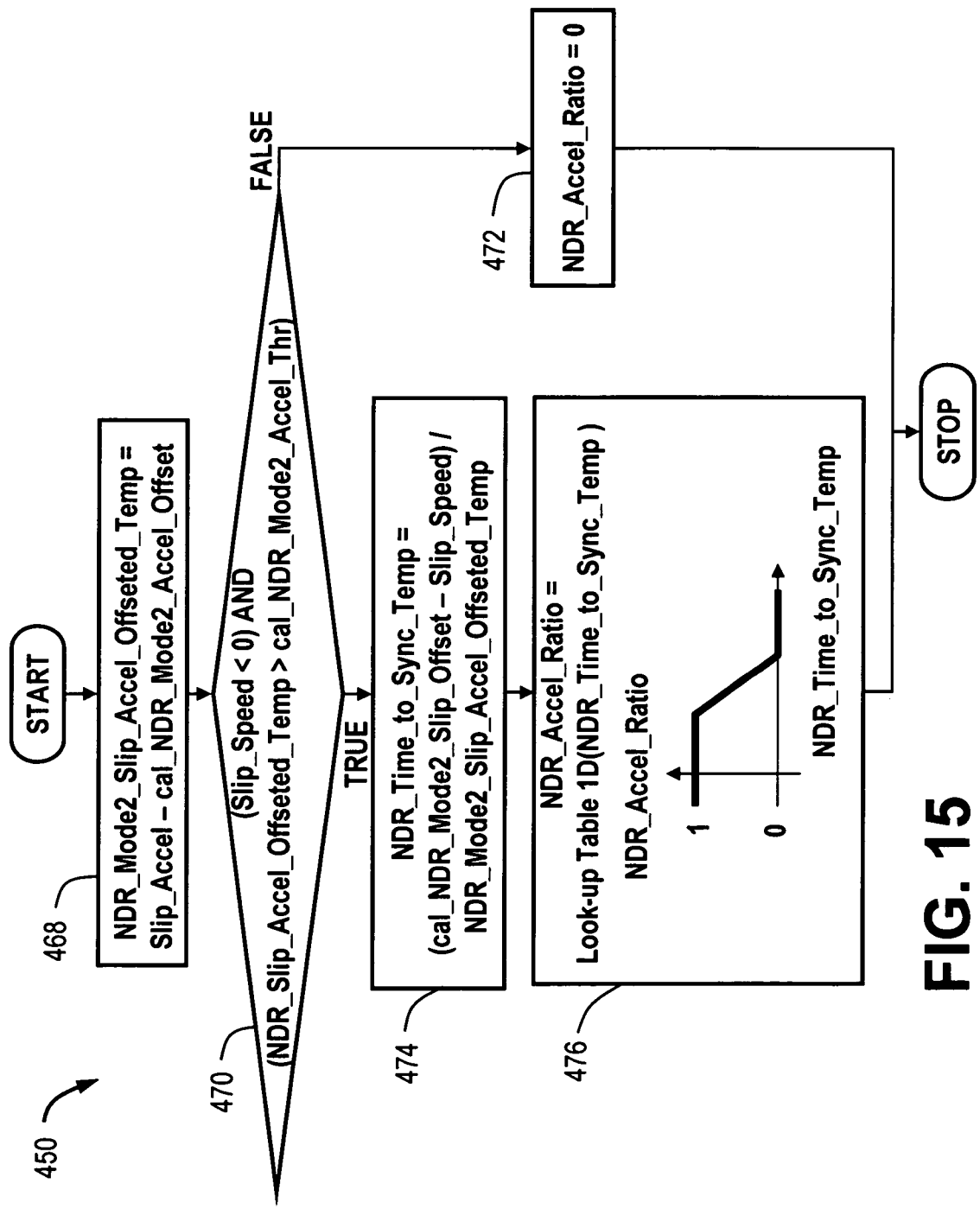
FIG. 15 is block diagram illustrating a routine for determining the NDR_Accel Ratio in Mode 2.

FIG. 15 illustrates a routine for the determination of the NDR_Accel_Ratio in Mode 2, as shown in block 450 of FIG. 12. The routine begins by determining a variable, NDR_Mode2_Slip_Accel_Offseted_Temp, as illustrated in block 468 by subtracting the calibration value, cal_NDR_Mode2_Accel_Offset from the variable, Slip_Accel. Slip_Accel is the calculated slip acceleration of clutch 2 which is calculated from the change in Slip_Speed using well-known methods. The calibration value, cal_NDR_Mode2_Accel_Offset, is an offset which avoids the potential for a divide by zero in a subsequent step. The value of NDR_Mode2_Slip_Accel_Offseted_Temp is passed to decision block 470 where it is compared to a calibration value, cal_NDR_Mode2_Accel_Thr. If the value of Slip_Speed is less than zero and the value of NDR_Mode2_Slip_Accel_Offseted_Temp is greater than the calibration value, cal_NDR_Mode2_Accel_Thr, which is a threshold value for Slip_Accel. If the result of the test is false, it passes to block 472 where the value of NDR_Accel_Ratio for Mode 2 operation is set equal to zero, and if the result is true, the routine passes to block 474. In block 474, the variable, NDR_Time_to_Sync_Temp, is calculated. NDR_Time_to_Sync_Temp is essentially an estimated time to a designated slip speed offset, represented by a calibration value, cal_NDR_Slip_Offset, with respect to the response of clutch 2. NDR_Time_to_Sync_Temp is calculated dividing the difference obtained by subtracting Slip_Speed from cal_NDR_Slip_Offset by NDR_Mode2_Slip_Accel_Offseted_Temp. The value of NDR_Time_to_Sync_Temp is passed to block 476 for the determination of the NDR_Accel_Ratio for Mode 2 operation from a one dimensional look up table as a function of the value of NDR_Time_to_Sync_Temp.

Figure 16:
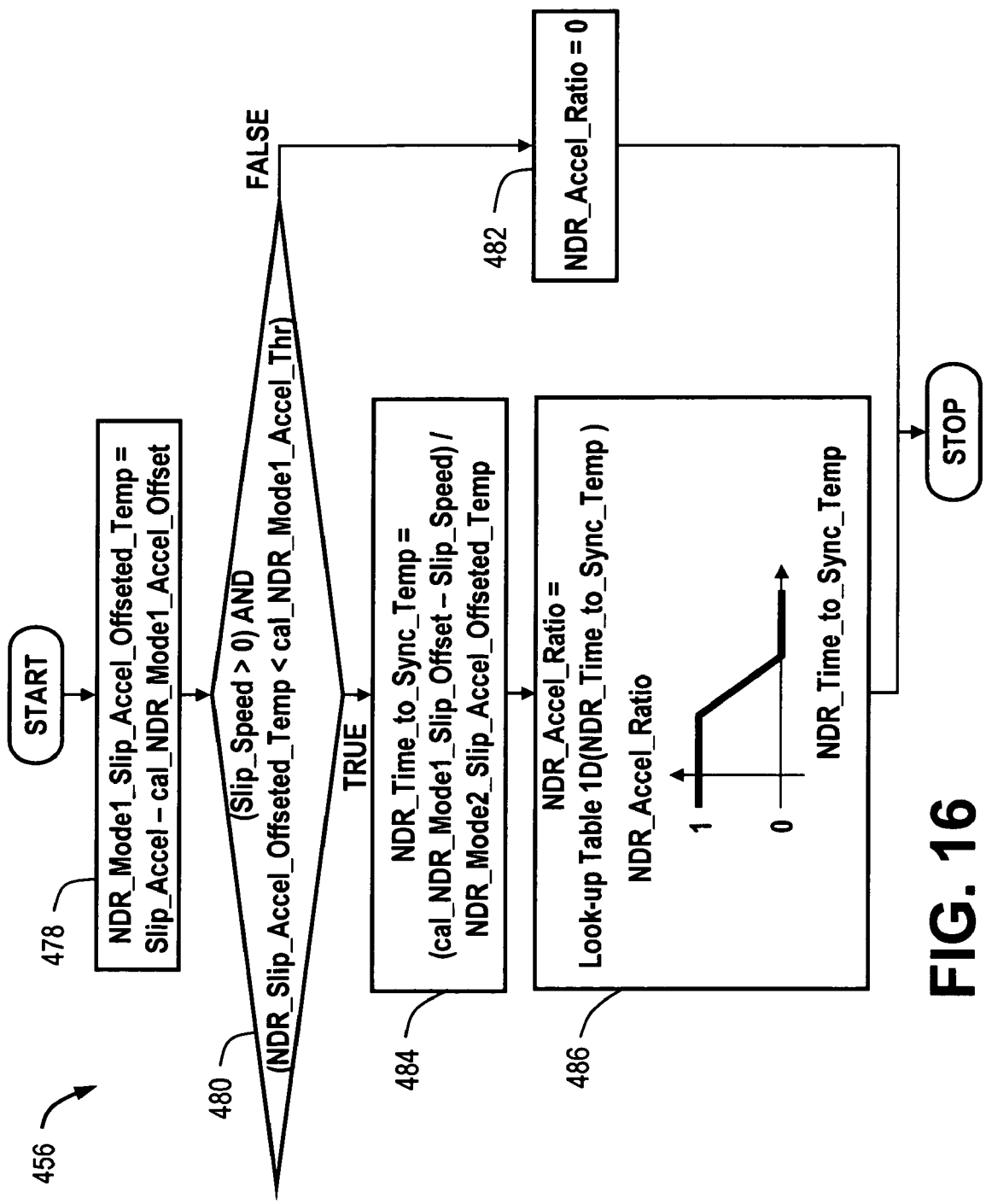
FIG. 16 is block diagram illustrating a routine for determining the NDR_Accel Ratio in Mode 1.

Similarly, FIG. 16 illustrates a routine for the determination of the NDR_Accel_Ratio in Mode 1, as shown in block 456 of FIG. 12. The routine begins by determining a variable, NDR_Mode1_Slip_Accel_Offseted_Temp, as illustrated in block 478 by subtracting the calibration value, cal_NDR_Mode1_Accel_Offset from the variable, Slip_Accel. Slip_Accel is the calculated slip acceleration of clutch 1 which is calculated from the change in Slip_Speed using well-known methods. The calibration value, cal_NDR_Mode1_Accel_Offset, is an offset which avoids the potential for a divide by zero in a subsequent step. The value of NDR_Mode1_Slip_Accel_Offseted_Temp is passed to decision block 480 where it is compared to a calibration value, cal_NDR_Mode1_Accel_Thr. If the value of Slip_Speed is greater than zero and the value of NDR_Mode1_Slip_Accel_Offseted_Temp is less than the calibration value, cal_NDR_Mode1_Accel_Thr, which is a threshold value for Slip_Accel. If the result of the test is false, it passes to block 482 where the value of NDR_Accel_Ratio for Mode 1 operation is set equal to zero, and if the result is true, the routine passes to block 484. In block 484, the variable, NDR_Time_to_Sync_Temp, is calculated. NDR_Time_to_Sync_Temp is essentially an estimated time to a designated slip speed offset, represented by a calibration value, cal_NDR_Slip_Offset, with respect to the response of clutch 1. NDR_Time_to_Sync_Temp is calculated dividing the difference obtained by subtracting Slip_Speed from cal_NDR_Slip_Offset by NDR_Mode1_Slip_Accel_Offseted_Temp. The value of NDR_Time_to_Sync_Temp is passed to block 486 for the determination of the NDR_Accel_Ratio for Mode 1 operation from a one dimensional look up table as a function of the value of NDR_Time_to_Sync_Temp.

Figure 17:
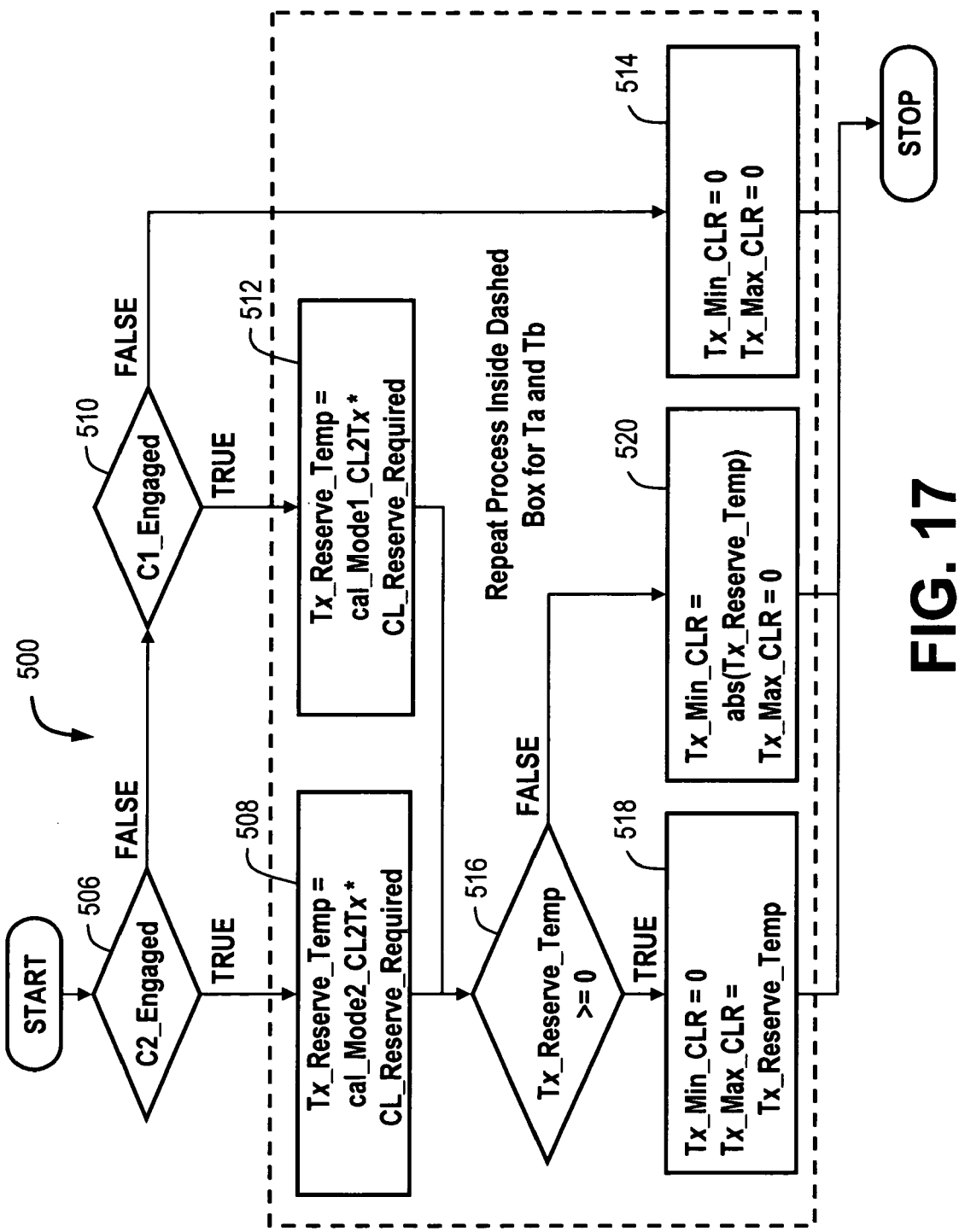
FIG. 17 is a block diagram of a routine for calculating a reactive closed loop input speed error in accordance with block 500 of FIG. 6

FIG. 17 illustrates a routine comprising a series of steps for calculating 175 a dynamic reactive motor torque reserve in order to establish a reserve of motor torque in response to an input speed error associated with the EVT. FIG. 17 also utilizes the nomenclature Tx to indicate that it may be used to calculate the motor torque reserve for motor A and motor B. The steps comprise calculating both the dynamic reactive maximum torque reserve value 502 and the dynamic reactive minimum torque reserve value 504. The steps may be generally characterized as calculating the reactive reserve value as a function of at least one transmission dynamic parameter. It is preferred that the transmission dynamic parameter comprises the input speed, particularly the input speed error. The steps may also be generally characterized as comprising calculating an input speed error maximum torque reserve value 502 and an input speed error minimum torque reserve value 504 as a function of an input speed error of the transmission, as described further below. The nomenclature used in FIG. 17 refers to a temporary or precursor value of the motor torque reserve, Tx_Reserve_Temp, which is tested to determine the value of Tx_Max_CLR and Tx_Min_CLR. Referring to FIG. 17, the routine starts with decision block 506 which tests to determine whether C2 is engaged (Mode 2 operation) which may be determined by the status of pressure switches and the slip speed associated with the clutch. If the result of the test of block 506 is true, the routine passes to block 508 to determine the value of Tx_Reserve_Temp in Mode 2, and if false, passes to decision block 510 which tests to determine whether C1 is engaged (Mode 1 operation) which may also be determined by the status of pressure switches and the slip speed associated with the clutch. From decision block 510, if the test is true, the routine proceeds to block 512 to determine the value of Tx_Reserve_Temp in Mode 1, and if false (i.e., the transmission is in a neutral state, passes to block 514 where the values of Tx_Max_CLR and Tx_Min_CLR are both set equal to zero (i.e., because no reserve is required). If the routine passes to one of blocks 508 or 512, the routine passes to block 516 to test whether the value of Tx_Reserve_Temp is greater than or equal to zero. If the result of the test is true, the routine passes to block 518, where the value of Tx_Max_CLR is set equal to the value of Tx_Reserve_Temp and Tx_Min_NDR is set equal to zero. If the result of the test is false, the routine passes to block 520, where the value of Tx_Min_CLR is set equal to the absolute value of Tx_Reserve_Temp and Tx_Max_NDR is set equal to zero. Thus, if the value of Tx_Reserve_Temp is positive or zero, the routine calculates an input acceleration maximum torque reserve value 502, and if it is negative, the routine calculates input acceleration minimum torque reserve value 504.

Referring to block 508, the value of Tx_Reserve_Temp in Mode 2 is calculated according to the relationship comprising:

$$Tx\_Reserve\_Temp = cal\_Mode2\_CL2Tx * CL\_Reserve\_Required, \quad (13)$$

where:

cal_Mode2_CL2Tx: is the K matrix calibration for the input speed error for Mode 2 operation:

K15=cal_Mode2_CL2Ta

K25=cal_Mode2_CL2Tb; and

CL_Reserve_Required is a variable which is a function of the Ni_Error_CL through a calibration look-up table.

Referring to block 512, the value of Tx_Reserve_Temp in Mode 1 is calculated according to the relationship comprising:

$$Tx\_Reserve\_Temp = cal\_Model\_CL1Tx * CL\_Reserve\_Required, \quad (14)$$

where:
cal_Model_CL2Tx: is the K matrix calibration for the input speed error for Mode 1 operation:
K15=cal_Model_CL2Ta
K25=cal_Model_CL2Tb; and
CL_Reserve_Required is a variable which is a function of the Ni_Error_CL through a calibration look-up table.

The dynamic closed loop torque reserve (CLR) is reactive in nature. It observes the error in input speed control, and responds reactively if the system is outside certain predetermined control limits. The primary input is the variable, Ni_Reference, which is the desired or targeted input speed profile. The closed loop input speed error, Ni_Error_CL, may be calculated according to the relationship comprising:

$$Ni\_Error\_CL = Ni - Ni\_Reference, \quad (15)$$

The closed loop input speed error, Ni_Error_CL, is the difference between the actual input speed, Ni, and the targeted input speed profile, Ni_Reference.

The CL_Reserve_Required variable is a function of Ni_Error_CL through a calibration look-up table. The premise of CL_Reserve_Required may be understood from the following examples. The first example involves a large positive value of Ni_Error_CL. This would involve a deviation of input speed control in such a way that the actual input speed is much greater than the targeted input speed. Under such conditions, the CL_Reserve_Required would be set negative to give the system more calibratable motor torque reserve in the direction that could pull the actual input speed down to the input speed profile and restore the desired control. The second example is quite similar and would involve a large negative Ni_Error_CL. This would involve deviation of control of input speed where the actual input speed is much lower than the targeted input speed. Under such conditions, the CL_Reserve_Required would be set positive to give the system more calibratable motor torque reserve in the direction that could pull the actual input speed back up to the input speed profile and again restore the desired control. This reserve may be described generally as being larger for larger values of Ni_Error_CL and smaller for smaller values of Ni_Error_CL.

It is preferred that each of Ta_Min_CLR, Ta_Max_CLR, Tb_Min_CLR, and Tb_Max_CLR is passed through a filter, such as a rate-limiter, first order filter or other suitable filter, to provide smoothing. If a rate limiter is used, it is preferred that separate positive and negative calibration rate limits be used.

This dynamic CL input speed reserve would be reactive. When a control issue is observed, the system would make the appropriate system torque constraint trade-offs (potentially involving a drop in the maximum allowable output torque) to allow the powertrain system the motor torque reserve necessary to restore the desired control parameters. From an overall view, this part of the algorithm could be viewed as a method for unloading the motors of responsibilities elsewhere in the system (generating output torque, for example) and freeing the motors up (in the right directions) to have more capability to attack the input speed control issue.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method of operating a vehicle powertrain system comprising an electric motor and transmission, the electric motor operably and selectively coupled to the transmission and adapted to provide an output torque contribution thereto, the electric motor having a predetermined maximum motor output torque and a predetermined minimum motor output torque which are used to determine a range of permissible control points for at least one transmission control parameter, comprising:
establishing a motor torque reserve by performing at least one of decreasing the predetermined maximum motor output torque to a maximum reserved motor output torque and increasing the predetermined minimum motor output torque to a minimum reserved motor output torque, wherein the maximum reserved motor output torque and the minimum reserved motor output torque are used in place of the predetermined maximum motor output torque and the predetermined minimum motor output torque, respectively, to determine the range of permissible control points for the at least one transmission control parameter.

2. The method of claim 1, wherein the motor torque reserve is a static torque reserve, and wherein a static reserve value is used to perform the at least one of decreasing the predetermined maximum motor output torque to a maximum reserved motor output torque and increasing the predetermined minimum motor output torque to a minimum reserved motor output torque.

3. The method of claim 2, wherein the static torque reserve is determined by decreasing the predetermined maximum motor output torque by the static reserve value to establish the maximum reserved motor output torque and increasing the predetermined minimum output torque by the static reserve value to establish the minimum reserved motor output torque.

4. The method of claim 3, wherein the static reserve value comprises a maximum static reserve value for decreasing the predetermined maximum output torque and a minimum static reserve value for increasing the predetermined minimum output torque, wherein the maximum static reserve value and the minimum static reserve value are different values.

5. The method of claim 1, wherein the motor torque reserve is a dynamic torque reserve, and wherein a dynamic reserve value is used to determine the dynamic torque reserve.

6. The method of claim 5, wherein the dynamic torque reserve is a predictive dynamic torque reserve, and wherein the dynamic reserve value is a predictive reserve value.

7. The method of claim 5, wherein the dynamic torque reserve is a reactive dynamic torque reserve, and wherein the dynamic torque reserve value is a reactive reserve value.

8. The method of claim 5, wherein the dynamic torque reserve comprises a predictive torque reserve and a reactive torque reserve, and wherein the dynamic torque reserve value comprises a predictive reserve value and a reactive reserve value.

9. The method of claim 6, wherein the predictive reserve value is calculated as a function of a predicted motor torque event.

10. The method of claim 9, wherein the predicted motor torque event is a transmission shift.

11. The method of claim 10, wherein the predictive reserve value is generally larger for points of operation nearer in time to the predicted transmission shift and generally smaller for points of operation farther in time from the predicted transmission shift.

12. The method of claim 10, wherein the predictive reserve value is calculated as a function of at least one transmission dynamic parameter.

13. The method of claim 12, wherein the at least one transmission dynamic parameter comprises a desired input acceleration and an output acceleration.

14. The method of claim 13, wherein the predictive reserve value is filtered by application of a filter.

15. The method of claim 14, wherein the filter comprises a rate limiter.

16. The method of claim 7, wherein the reactive reserve value is calculated as a function of at least one transmission dynamic parameter.

17. The method of claim 16, wherein the transmission dynamic parameter comprises an input speed error.

18. The method of claim 17, wherein the reactive reserve value is generally larger for larger values of the input speed error and smaller for smaller values of the input speed error.

19. The method of claim 16, wherein the reactive reserve value is filtered by application of a filter.

20. The method of claim 19. wherein the filter comprises a rate limiter.

21. The method of claim 1, wherein the motor torque reserve comprises a static reserve value and a dynamic reserve value, and wherein the static reserve value and the dynamic reserve value are used to perform the at least one of decreasing the predetermined maximum motor output torque to a maximum reserved motor output torque and increasing the predetermined minimum motor output torque to a minimum reserved motor output torque.

22. The method of claim 1, wherein the motor torque reserve is determined by decreasing the predetermined maximum motor output torque by the static and dynamic reserve values to establish the maximum reserved motor output torque and increasing the predetermined minimum output torque by the static and dynamic reserve values to establish the minimum reserved motor output torque.

23. The method of claim 2, wherein the static reserve value comprises a maximum static reserve value for decreasing the predetermined maximum output torque and a minimum static reserve value for increasing the predetermined minimum output torque. wherein the maximum static reserve value and the minimum static reserve value are different values.

24. The method of claim 21, wherein the dynamic reserve value is a predictive reserve value.

25. The method of claim 21, wherein the dynamic reserve value is a reactive reserve value.

26. The method of claim 21, wherein the dynamic reserve value comprises a predictive reserve value and a reactive reserve value.

27. The method of claim 24, wherein the predictive reserve value is calculated as a function of a predicted motor torque event.

28. The method of claim 27, wherein the predicted motor torque event is a transmission shift.

29. The method of claim 28, wherein the predictive reserve value is generally larger for points of operation nearer in time to the predicted transmission shift and generally smaller for points of operation farther in time from the predicted transmission shift.

30. The method of claim 28, wherein the predictive reserve value is calculated as a function of at least one transmission dynamic parameter.

31. The method of claim 30, wherein the at least one transmission dynamic parameter comprises a desired input acceleration and an output acceleration.

32. The method of claim 31, wherein the predictive reserve value is filtered by application of a filter.

33. The method of claim 32, wherein the filter comprises a rate limiter.

34. The method of claim 25, wherein the reactive reserve value is calculated as a function of at least one transmission dynamic parameter.

35. The method of claim 34, wherein the transmission dynamic parameter comprises an input speed error.

36. The method of claim 35, wherein the reactive reserve value is generally larger for larger values of the input speed error and smaller for smaller values of the input speed error.

37. The method of claim 34, wherein the reactive reserve value is filtered by application of a filter.

38. The method of claim 37, wherein the filter comprises a rate limiter.

* * * * *